(12) United States Patent
Mitsui et al.

(10) Patent No.: US 7,495,248 B2
(45) Date of Patent: Feb. 24, 2009

(54) POSITION DETECTING APPARATUS AND POSITION DETECTING METHOD

(75) Inventors: Soichiro Mitsui, Kanagawa (JP); Hideki Ito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/850,364

(22) Filed: Sep. 5, 2007

(65) Prior Publication Data
US 2008/0203334 A1  Aug. 28, 2008

(30) Foreign Application Priority Data
Feb. 26, 2007  (JP) .............................. 2007-045502

(51) Int. Cl.
G01N 21/86 (2006.01)
G01V 8/00 (2006.01)
(52) U.S. Cl. ............................. 250/559.36; 250/559.29
(58) Field of Classification Search ............ 250/559.36, 250/559.29
See application file for complete search history.

(56) References Cited

U.S. PATENT DOCUMENTS 6,901,314 B2  5/2005  Mitsui et al.
7,075,621 B2  7/2006  Mitsui et al.
7,340,087 B2 *  3/2008  Watkins et al. ......... 250/559.36

FOREIGN PATENT DOCUMENTS

| JP | 2002-299225 | 10/2002 |
|----|-------------|---------|
| JP | 2004-214658 | 7/2004  |
| JP | 2005-268464 | 9/2005  |
| JP | 3795820     | 4/2006  |
| JP | 2006-153899 | 6/2006  |
| JP | 2006-184442 | 7/2006  |

* cited by examiner

Primary Examiner—Seung C Sohn
(74) Attorney, Agent, or Firm—Oblon, Spivak, McClelland, Maier & Neustadt, P.C.

(57) ABSTRACT

A position detecting apparatus includes a first illuminating unit that radiates light onto a substrate in a direction substantially parallel to the front and the rear surfaces of the substrate from the direction of a lateral face of the substrate; a second illuminating unit that radiates light onto the front surface of the substrate, in a direction substantially perpendicular to the front surface of the substrate; an image pickup unit that takes an image of the substrate from a rear surface side thereof; and an edge-position detecting unit that detects an edge position of the substrate, based on a first image that is taken while the light is being radiated from the first illuminating unit and a second image that is taken while the light is being radiated from the second illuminating unit, respectively.

16 Claims, 25 Drawing Sheets

A...POSITION MEASURED BY USING FIRST ILLUMINATING DEVICE
B...POSITION MEASURED BY USING SECOND ILLUMINATING DEVICE
DIFFERENCE...B-A (VIEW FROM BOTTOM OF COVER)

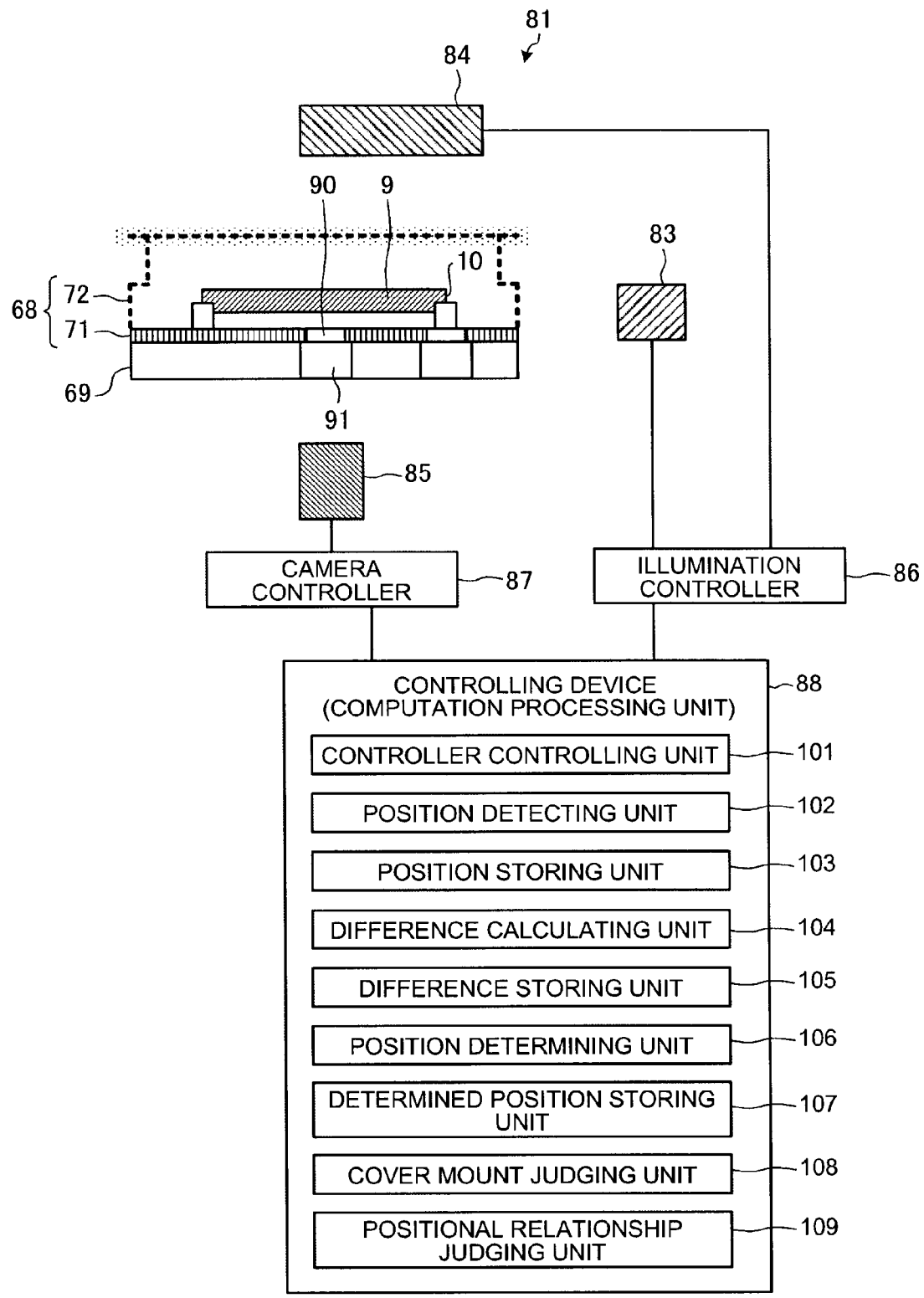

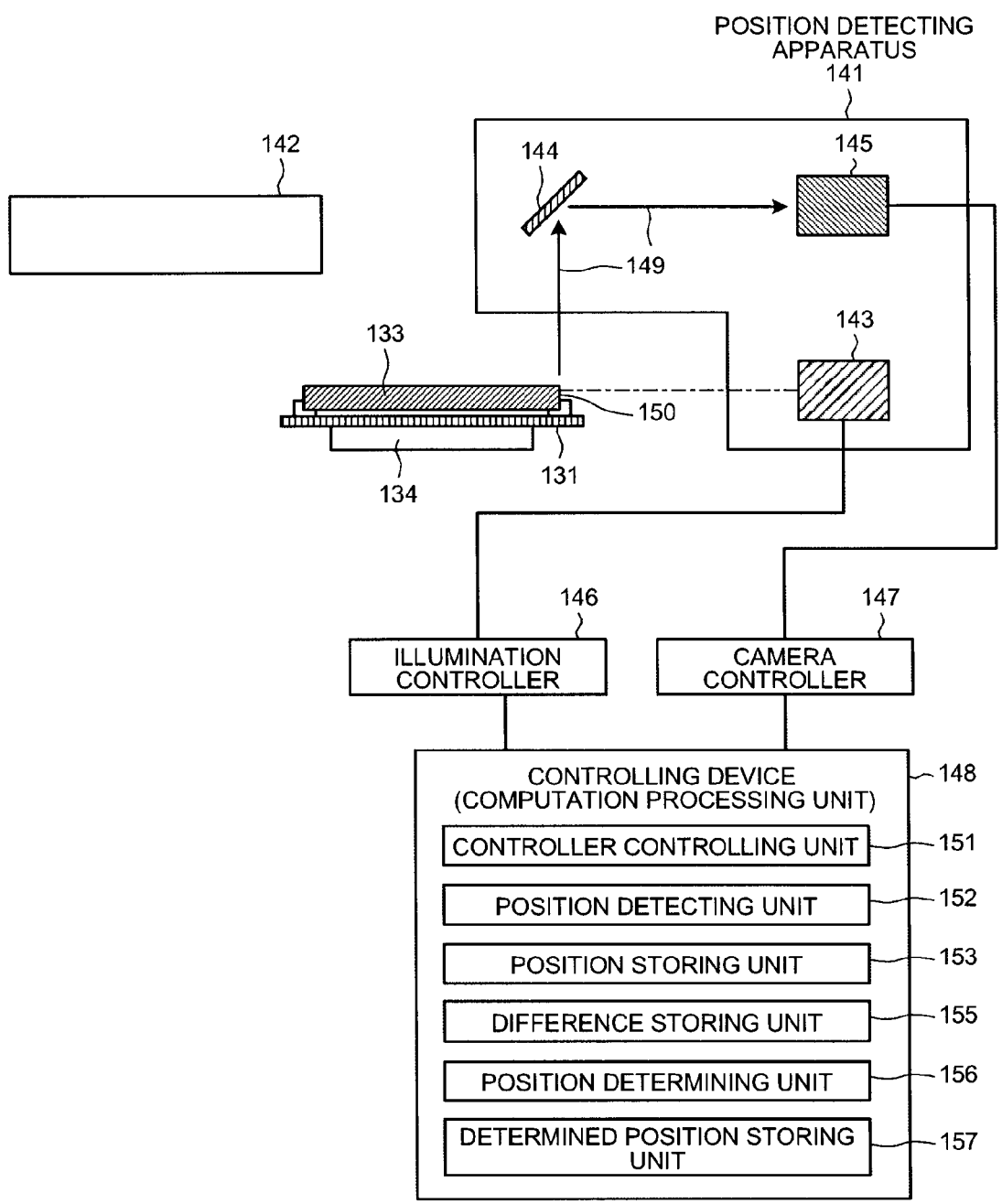

POSITION DETECTING APPARATUS AND POSITION DETECTING METHOD

CROSS-REFERENCE TO RELATED APPLICATIONS

This application is based upon and claims the benefit of priority from the prior Japanese Patent Application No. 2007-045502, filed on Feb. 26, 2007; the entire contents of which are incorporated herein by reference.

BACKGROUND OF THE INVENTION

1. Field of the Invention

The present invention relates to a position detecting apparatus and a position detecting method that are suitable for detecting an edge position of a substrate.

2. Description of the Related Art

Recently, Extreme Ultraviolet (EUV) lithography, which is a projection exposure technique of a reduced-reflection type that uses a soft X-ray of 5 nanometers to 15 nanometers, is considered to be one of the most promising candidates for the next-generation lithography technique. The development of EUV lithography is pursued on a world-wide scale.

One of the issues that need attention while implementing the EUV lithography technique is how to deal with foreign substances on masks. Particles adhering to EUV masks in the manufacturing process thereof greatly influence the yield of the EUV masks, just like in the example of ordinary photomasks that are currently in the market. For the ordinary photomasks, protection covers called pellicles are used to prevent particles from adhering to the photomasks. However, it is not possible to use pellicles in an EUV ray region. Thus, preventing particles from adhering to EUV masks in the manufacturing process thereof is a major issue.

Also, adhesions of particles can cause a problem whenever EUV masks on which a pattern is formed are used in the manufacturing process of semiconductors. For example, when an EUV mask is carried into (or carried out from) a case or a pod, if the EUV mask touches the case or the pod, particles that are caused by the touching may adhere to the EUV mask. As another example, when an EUV mask is carried into (or carried out from) a vacuum apparatus such as a dry etching apparatus, during a vacuuming (pumping down) process (or an air-venting process) performed in a load-lock chamber, particles that are present in the load-lock chamber or particles that are brought into the load-lock chamber when the EUV mask is carried therein may be stirred up because of the vacuuming (pumping down) process (or the air-venting process) and may adhere to the EUV mask. The same problem can also occur in an EUV exposure apparatus, which is a type of vacuum apparatus.

To prevent particle adhesions, for example, it has been suggested that a cover-like structure designed to block such particles should be mounted over an EUV mask so that the surface of the EUV mask is protected. The cover-like structure is configured so that it can be attached to and detached from the EUV mask and is called a removable pellicle. Different types of structures such as ones in the form of a tray and a bracket have been proposed as configuration of removable pellicles. In any case, these removable pellicles are used for the purpose of preventing particles from adhering to the pattern-forming surface side of EUV masks, either by mounting a removable pellicle over an EUV mask or mounting an EUV mask over a removable pellicle. As disclosed in JP-A 2002-299225 (KOKAI), JP-A 2006-184442 (KOKAI), and JP-A 2005-268464 (KOKAI), mechanical supporting pins or pads made of a resin is used in parts of each removable pellicle that are in contact with an EUV mask. Each removable pellicle holds the upper and the lower faces or the lateral faces of an EUV mask via those parts that are in contact with the EUV mask.

Accordingly, like in the example above in which the EUV mask is carried into (or carried out from) a case or a pod, when an EUV mask is attached to or detached from a removable pellicle, particles occur when the EUV mask comes into contact with (or comes out of contact with) the removable pellicle. In addition, when an EUV mask is transported while being attached to a removable pellicle, particles occur if the EUV mask and the removable pellicle rub against each other. In such a situation, if the positional relationship between the EUV mask and the removable pellicle is not a proper one, the size of the areas of the parts of the supporting pins or the pads of the removable pellicle that are in contact with the EUV mask becomes larger. As a result, a larger amount of particles will occur. To avoid this situation, before an EUV mask is attached to a removable pellicle, it is necessary to detect the positions of the EUV mask and the removable pellicle, so that if the positional relationship between them largely differs from a proper one, the attaching process should be stopped for a while, and the positional relationship can be corrected.

JP-A 2004-214658 (KOKAI) discloses a method for detecting the position of a mask by detecting a mark formed on the mask through a transparent window provided in a container. Also, JP-A 2006-153899 (KOKAI) discloses a method for detecting the positions of a mask and a mask protecting member by detecting position measuring marks that are formed on the mask and the mask protecting member, respectively. Both of these methods are characterized in that the position of the mask (or the mask protecting member) is detected by detecting the mark that is formed, in advance, in the mask (or in the mask protecting member).

Particles can adhere not only to a mask on which a pattern (or a mark used for measuring the position) has already been formed, but also to a mask blank on which a pattern has not yet been formed. Thus, it is necessary to realize a position detecting method that can be used with mask blanks. For this purpose, it is necessary to detect the position of each mask blank with a high level of precision, without being influenced by the material of which the mask blank is made, the material of which a film is formed, and the state in which the film is formed. To achieve this goal, the inventors of the present application have proposed a method in which, while light is radiated on a mask or a mask blank from the direction of a lateral face thereof, an image of a portion that includes a substrate edge of the mask or the mask blank is taken from the front surface (or the rear surface) thereof so that the position of the substrate edge is measured based on the image of scattered light on the substrate edge that has been taken (Japanese Patent No. 3795820).

According to this method, however, the level of precision in the position detection process can be low, depending on the shape of the substrate edge of the mask or the mask blank. In some situations, it is not possible to accurately detect the position of the substrate.

In addition, in some situations, depending on the shape of the substrate edge of the mask or the mask blank, it is not possible to accurately detect the position of the substrate while the substrate is attached to a cover-like structure such as a removable pellicle.

SUMMARY OF THE INVENTION

According to one aspect of the present invention, a position detecting apparatus includes at least one first illuminating unit that is located so that a rear surface of a substrate and a radiation center of an illuminating mechanism of the first illuminating unit are positioned on a substantially same plane, and radiates light onto the substrate in a direction substantially parallel to a front surface and the rear surface of the substrate from a lateral direction of the substrate; a second illuminating unit that is provided above the front surface of the substrate and radiates light onto an area including an edge portion of the substrate in a direction substantially perpendicular to the front surface of the substrate; an image pickup unit that is disposed on a rear surface side of the substrate so that an edge of the substrate is positioned within an image pickup range thereof and takes an image of the substrate from the rear surface side of the substrate; and an edge-position detecting unit that detects at least one edge position of the substrate, based on a first image taken by the image pickup unit while the light is being radiated from the first illuminating unit and a second image taken by the image pickup unit while the light is being radiated from the second illuminating unit.

According to another aspect of the present invention, a position detecting method includes first illuminating light onto a substrate in a direction substantially parallel to a front surface and the rear surface of the substrate from a lateral direction of the substrate so that a rear surface of the substrate and a radiation center of an illuminating mechanism are positioned on a substantially same plane; second illuminating light onto an area including an edge portion of the substrate in a direction substantially perpendicular to the front surface of the substrate from above the front surface of the substrate; taking an image of the substrate from the rear surface side thereof so that an edge of the substrate is positioned within an image pickup range; and detecting at least one edge position of the substrate, based on a first image taken in the taking while the light is being radiated in the first illuminating and a second image taken in the taking while the light is being radiated in the second illuminating.

BRIEF DESCRIPTION OF THE DRAWINGS

FIG. 20 is a side view of a first position detecting apparatus in a first processing chamber before a cover is mounted over a mask substrate;

FIG. 27 is a schematic drawing of a position detecting apparatus that measures the position of an EUV mask, before the EUV mask is installed on a mask chuck provided on a mask stage included in an exposure apparatus.

DETAILED DESCRIPTION OF THE INVENTION

Exemplary embodiments of a position detecting apparatus and a position detecting method according to the present invention will be explained in detail, with reference to the accompanying drawings.

A first embodiment of the present invention will be explained with reference to the accompanying drawings.

Figure 1:
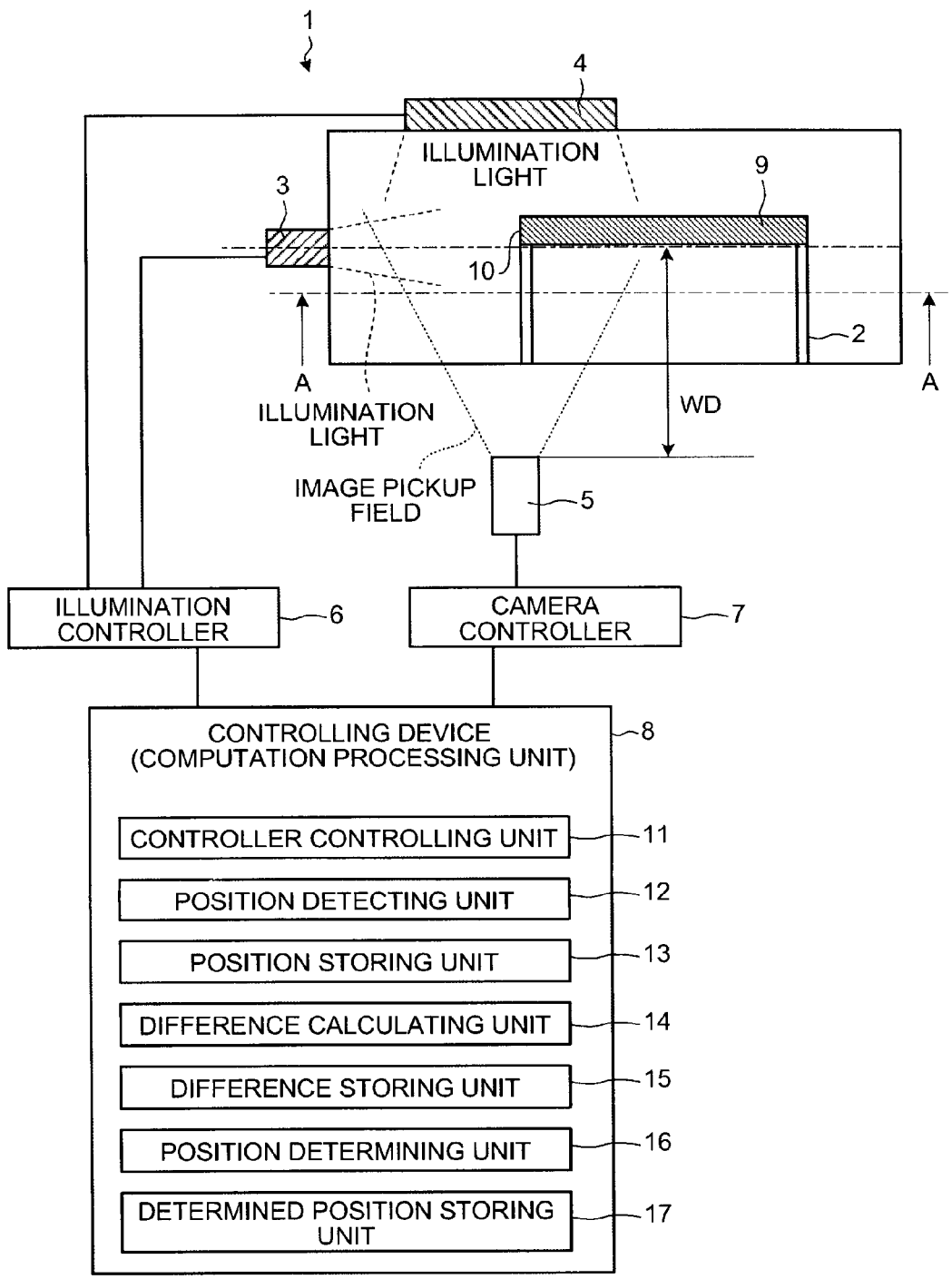
FIG. 1 is a schematic drawing of a position detecting apparatus according to a first embodiment of the present invention.
Figure 2:
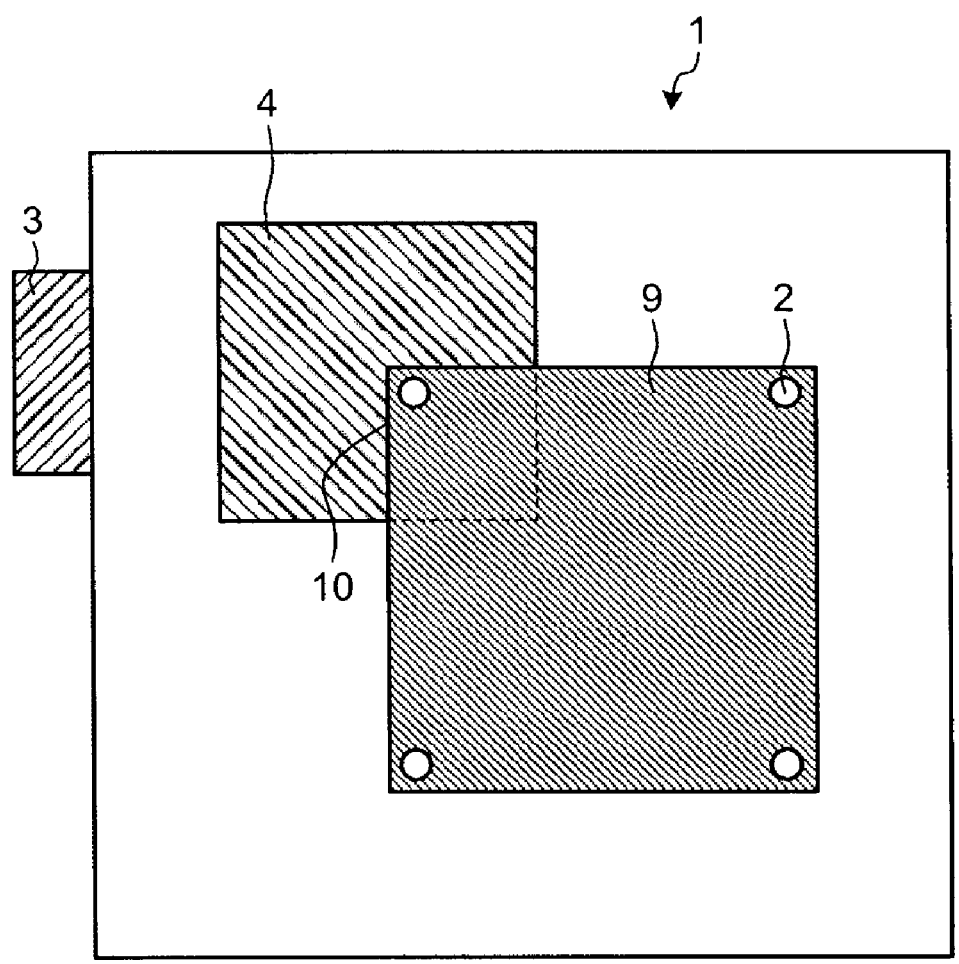
FIG. 2 is a cross-sectional view of the position detecting apparatus shown in FIG. 1 that is obtained as being viewed in the directions of the arrows A-A.

As shown in FIGS. 1 and 2, a position detecting apparatus 1 according to the first embodiment is configured so as to include: mask-substrate supporting columns 2; a first illuminating device 3; a second illuminating device 4; an image pickup device 5; an illumination controller 6; a camera controller 7; and a controlling device (computation processing unit) 8. A mask substrate 9 of which the position is to be detected is mounted on the mask-substrate supporting columns 2. The mask substrate 9 is, for example, a chromium (Cr) mask or an EUV mask. The mask substrate 9 may be either a mask on which a pattern has already been formed or a mask blank on which a pattern has not yet been formed.

The first illuminating device 3 radiates light in a direction substantially parallel to the front and the rear surfaces of the mask substrate 9 from a lateral face of the mask substrate 9. The illumination light has an intensity distribution spreading, in an up-and-down direction, in a range that is larger than the thickness of the mask substrate 9. Thus, the first illuminating device 3 is installed so that the rear surface (i.e., the lower surface) of the mask substrate 9 and a radiation center of the first illuminating device 3 are positioned on substantially the same plane.

The second illuminating device 4 radiates light in a direction substantially perpendicular to the front surface (i.e., the upper surface) of the mask substrate 9 from above the front surface of the mask substrate 9. Thus, the second illuminating device 4 is installed above the front surface of the mask substrate 9 and has an illumination range in which a substrate edge portion 10 of the mask substrate 9 is sufficiently illuminated. In the present example, LEDs are used in the first illuminating device 3 and the second illuminating device 4.

The image pickup device 5 takes a first image and a second image. The first image is an image taken while the light is being radiated from the first illuminating device 3. The second image is an image taken while the light is being radiated from the second illuminating device 4. Thus, the image pickup device 5 is installed beneath the rear surface of the mask substrate 9 by being fixed by a camera support (not shown). A Charge Coupled Device (CCD) camera can be used as the image pickup device 5. The distance between the image pickup device 5 and the rear surface of the mask substrate 9 is adjusted so as to be an image pickup distance (i.e., a working distance [WD]). In addition, a camera in the image pickup device 5 is finely adjusted so that a lens unit in the camera is adjusted and focused on the rear surface of the mask substrate 9. In the present example, after the focus is adjusted, the camera is used with a fixed focus.

The image pickup distance is determined based on a relationship among a focus distance defined by a combination of the CCD camera and the lens, an image pickup range (i.e., the size of the field) that is required, and an optical detection resolution of the CCD camera per pixel. In the present example, to detect the position of the mask substrate with a micron-order precision level, a 1024-pixel camera is used on an assumption that the size of the field is approximately 50 millimeters squared. By processing images in units of sub-pixels, it is possible to measure a detected position with an optical resolution of approximately 5 micrometers.

It is understood from FIGS. 1 and 2 that the positional relationship between the first illuminating device 3 and the substrate edge portion 10 is arranged so that the substrate edge portion 10 is included in a part of the illumination range of the light radiated from the first illuminating device 3. Further, the image pickup range of the image pickup device 5 is an area that includes the substrate edge portion 10 on which the light from the first illuminating device 3 is radiated. In addition, the positional relationship between the second illuminating device 4 and the substrate edge portion 10 is arranged so that the substrate edge portion 10 is included in a part of the illumination range of the light radiated from the second illuminating device 4. Further, the image pickup range of the image pickup device 5 is an area that includes the substrate edge portion 10 on which the light from the second illuminating device 4 is radiated.

The distance between a light emission plane of the first illuminating device 3 and the substrate edge portion 10 varies depending on the size of the mask substrate 9. However, even if this distance changes, only the intensity (the level of brightness) of the images taken by the CCD camera changes. Thus, there is no particular problem in having a larger distance as long as the distance is within the detection sensitivity range of the CCD camera.

The illumination controller 6 controls the first illuminating device 3 and the second illuminating device 4. More specifically, based on the control of the controlling device 8, the illumination controller 6 issues instructions to turn on and off the lights of the illuminating devices and to change or adjust, in an incremental manner, the illumination light quantity of the illuminating devices, in synchronization with the timing of the image pickup process. For example, the illumination controller 6 can be a Central Processing Unit (CPU) or a microcomputer. The camera controller 7 controls the image pickup device 5. More specifically, the camera controller 7 issues instructions related to an image pickup period (i.e., a shutter period) of the camera and instructions to have images taken. When the camera being used has an auto-focus mechanism, the camera controller 7 also adjusts the focus. For example, the camera controller 7 can be a CPU or a microcomputer.

The controlling device 8 controls the illumination controller 6 and the camera controller 7. Also, the controlling device 8 detects and determines the position of the mask substrate 9 (i.e., an edge position of the substrate edge portion 10) based on the first image and/or the second image taken by the image pickup device 5. The controlling device 8 is configured so as to include: a controller controlling unit 11; a position detecting unit 12; a position storing unit 13; a difference calculating unit 14; a difference storing unit 15; a position determining unit 16; and a determined-position storing unit 17.

The controller controlling unit 11 controls the illumination controller 6 and the camera controller 7. The position detecting unit 12 detects an edge position A of the substrate edge portion 10, based on the first image taken by the image pickup device 5, and also detects an edge position B of the substrate edge portion 10, based on the second image taken by the image pickup device 5. The details of the method used for detecting the positions will be explained later. The position storing unit 13 is a storage medium, such as a memory, that stores therein the edge position A of the substrate edge portion 10 that has been detected based on the first image and the edge position B of the substrate edge portion 10 that has been detected based on the second image.

The difference calculating unit 14 calculates a difference "B–A" between the edge position A of the mask substrate 9 that has been detected based on the first image and the edge position B of the mask substrate 9 that has been detected based on the second image. The difference storing unit 15 is a storage medium, such as a memory, that stores therein the difference "B–A" calculated by the difference calculating unit 14. The position determining unit 16 determines an edge position of the substrate edge portion 10, based on the edge position A, the edge position B, and the difference "B–A". The determined-position storing unit 17 is a storage medium, such as a memory, that stores therein the determined edge position of the substrate edge portion 10. For example, the controlling device 8 can be a CPU or a microcomputer. The position storing unit 13, the difference storing unit 15, and the determined-position storing unit 17 can each be a cache memory in the CPU or the microcomputer. Alternatively, they can each be a Random Access Memory (RAM) (not shown) or the like.

Next, the method for detecting the positions that is used by the position detecting apparatus configured as described above will be explained with reference to FIG. 3.

First, the mask substrate 9 is set up in the position detecting apparatus 1 (step S301). More specifically, the mask substrate 9 is mounted on the mask-substrate supporting columns 2. The position detection process is performed in the following steps.

The light of the first illuminating device 3 is turned on so that light is radiated onto the mask substrate 9 from the direction of a lateral face of the substrate edge portion 10 of the mask substrate 9 (step S302). More specifically, having received an instruction to turn on the light from the controlling device 8, the illumination controller 6 turns on the light of the first illuminating device 3.

The image pickup device 5 takes an image while the light is being radiated from the first illuminating device 3 (step S303). More specifically, having received an instruction to take an image from the controlling device 8, the camera controller 7 causes the image pickup device 5 to take the image.

The position detecting unit 12 detects the edge position A of the substrate edge portion 10 based on the first image that has been taken by the image pickup device 5. The position storing unit 13 then stores therein the detected edge position A (step S304). The specific method used by the position detecting unit 12 to detect the edge position A of the substrate edge portion 10 based on the first image that has been taken by the image pickup device 5 will be explained below.

Figure 4:
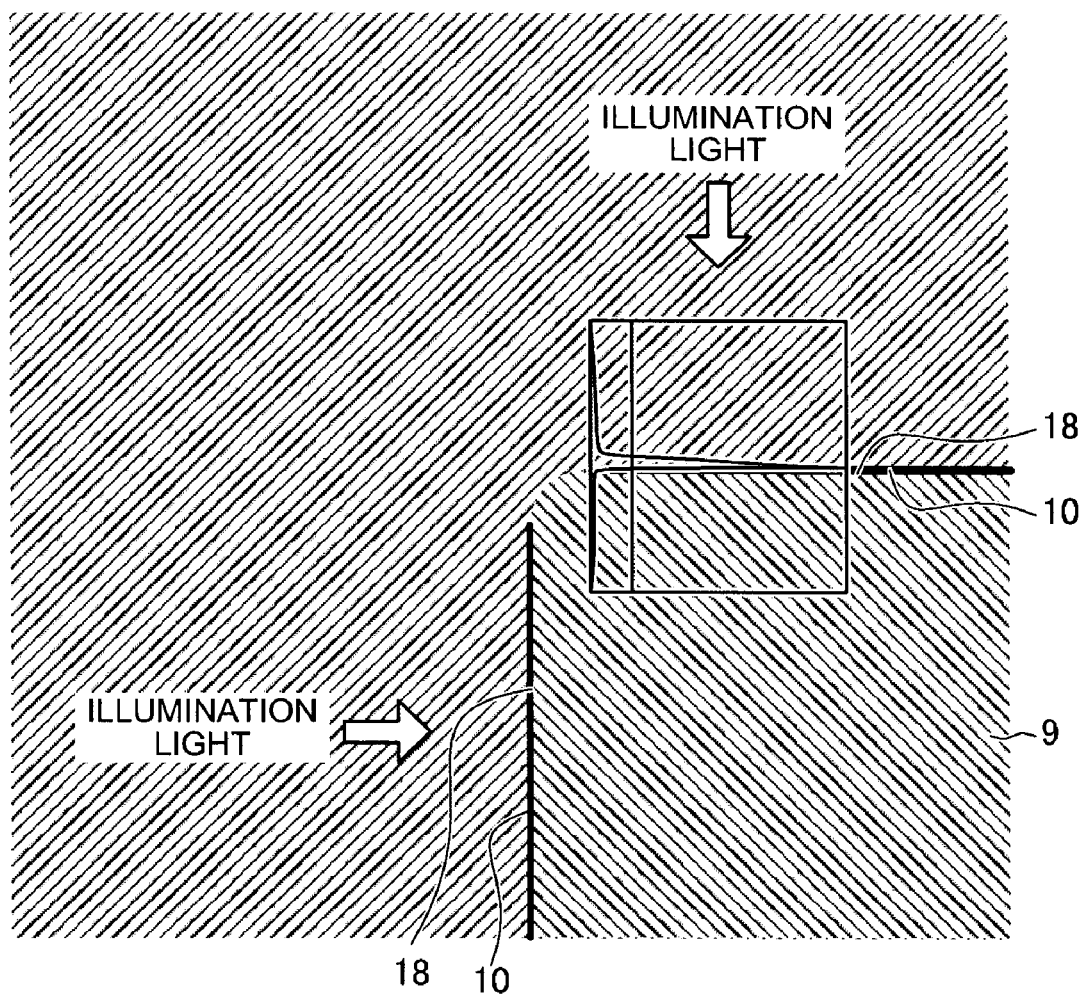
FIG. 4 is a schematic drawing of a first image taken by an image pickup device.

Shown in FIG. 4 is a situation in which two of the first illuminating devices 3 are respectively installed in two places (i.e., the upper side and the left side in the drawing) with respect to the mask substrate 9 so that light is radiated onto the mask substrate 9 from each of the first illuminating devices 3. As a result, scattered light 18 is generated with high contrast in two places in the substrate edge portion 10 (on the upper side and the left side of the mask substrate 9) so that an image of the substrate edge portion 10 is formed. In this example, a waveform that is shown overlapping with the substrate edge portion 10 on the upper side is an image intensity profile of the scattered light 18.

The position detecting unit 12 calculates the image intensity profile of the scattered light 18 in the substrate edge portion 10 based on the first image taken by the image pickup device 5 and further detects the edge position A of the substrate edge portion 10 based on the image intensity profile of the scattered light 18.

Figure 5:
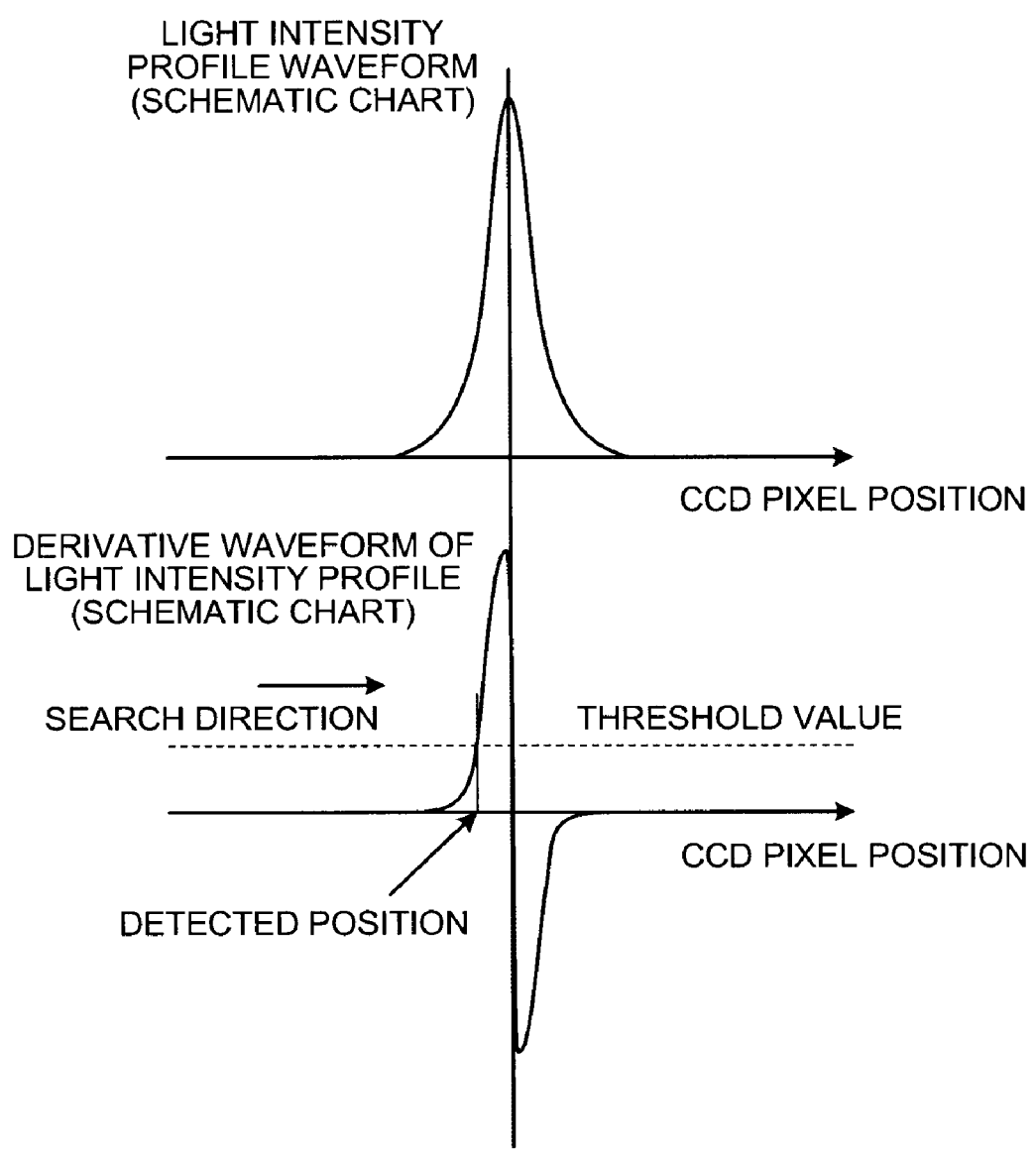
FIG. 5 is a schematic drawing for explaining a method for detecting an edge position of a substrate edge portion based on a light intensity profile.

Shown in the upper half of FIG. 5 is a schematic chart of the waveform of the image intensity profile of the scattered light shown in FIG. 4. Shown in the lower half of FIG. 5 is a waveform chart obtained by calculating the first derivative of this waveform at CCD pixel positions. The vertical axes in the upper half and the lower half of FIG. 5 each express the light intensity in the pixels. The unit is on an arbitrary scale. The horizontal axes in the upper half and the lower half of FIG. 5 each express the CCD pixel positions of the camera. In this situation, in the derivative waveform shown in the lower half, a threshold value for the intensity level is set in advance, and a search is conducted in the derivative waveform from the left to the right so that a position at which the derivative waveform intersects the threshold value is detected as the edge position of the substrate edge portion. In the derivative waveform of the light intensity profile shown in the drawing, the threshold value is set for a gradient of the light intensity that changes from dark to bright with respect to the search direction. This threshold value is set based on the noise level of the waveform or the like. In the present example, the threshold value is set to 30% of the maximum intensity.

Figure 3:
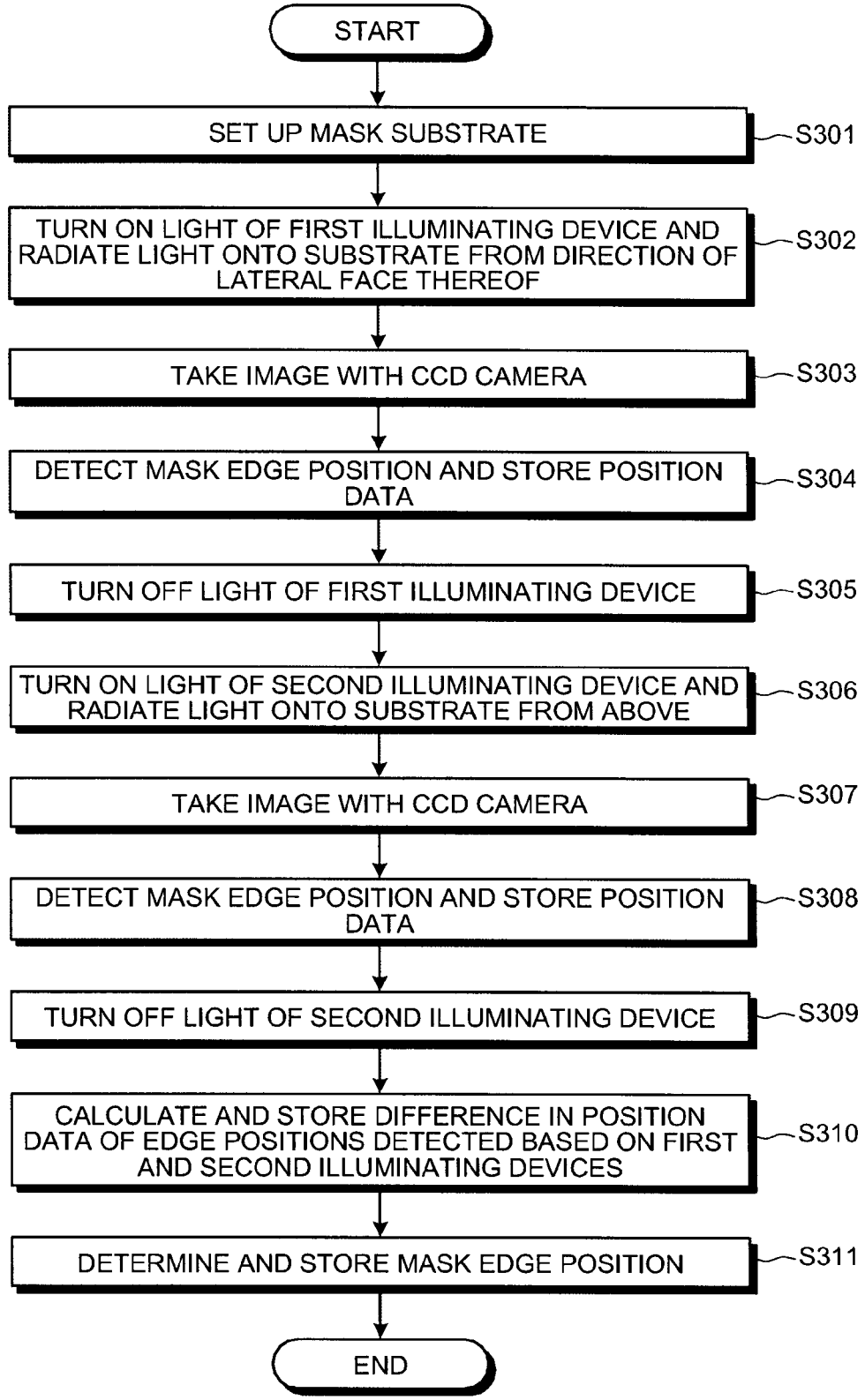
FIG. 3 is a flowchart of a procedure in a position detection process performed by the position detecting apparatus.

Returning to the description of FIG. 3, at step S304, after the position storing unit 13 stores therein the edge position A of the substrate edge portion 10 that has been detected based on the first image, the light of the first illuminating device 3 is turned off (step S305). More specifically, having received an instruction to turn off the light from the controlling device 8, the illumination controller 6 turns off the light of the first illuminating device 3.

The light of the second illuminating device 4 is turned on so that light is radiated in a direction perpendicular to the front surface of the mask substrate 9 from above the mask substrate 9 (step S306). More specifically, having received an instruction to turn on the light from the controlling device 8, the illumination controller 6 turns on the light of the second illuminating device 4.

The image pickup device 5 takes an image while the light is being radiated from the second illuminating device 4 (step S307). More specifically, having received an instruction to take an image from the controlling device 8, the camera controller 7 causes the image pickup device 5 to take the image.

The position detecting unit 12 detects the edge position B of the substrate edge portion 10 based on the second image that has been taken by the image pickup device 5. The position storing unit 13 then stores therein the detected edge position B (step S308). The specific method used by the position detecting unit 12 to detect the edge position B of the substrate edge portion 10 based on the second image that has been taken by the image pickup device 5 is the same as the method described above for detecting the edge position A of the substrate edge portion 10 based on the first image taken by the image pickup device 5. It should be noted, however, that because the second image at this step is obtained by taking an image of a part through which the illumination light reaches the CCD camera and a part shadowed by the mask substrate 9, the darkness/brightness of the image of the substrate edge portion positioned at the boundary between these parts is different from that of the first image used at step S304. Accordingly, a threshold value is set for a gradient of the light intensity by which the derivative waveform of the light intensity profile changes from bright to dark with respect to the search direction.

More specifically, based on the second image taken by the image pickup device 5, an image intensity profile of the light is calculated in the substrate edge portion 10 positioned at the boundary between the part through which the illumination light reaches the CCD camera and the part shadowed by the mask substrate 9, and further, the first derivative of the waveform of the image intensity profile of the light is calculated. A threshold value for the intensity level is set, in advance, in the derivative waveform, and a search is conducted in the derivative waveform from the left to the right so that a position at which the derivative waveform intersects the threshold value is detected as the edge position B of the substrate edge portion 10. The threshold value is set based on the noise level of the waveform or the like. In the present example, the threshold value is set to 30% of the maximum intensity.

Returning to the description of FIG. 3, at step S308, after the position storing unit 13 stores therein the edge position B of the substrate edge portion 10 that has been detected based on the second image, the light of the second illuminating device 4 is turned off (step S309). More specifically, having received an instruction to turn off the light from the controlling device 8, the illumination controller 6 turns off the light of the second illuminating device 4.

Next, the difference calculating unit 14 calculates a difference in the position data based on the edge position A of the substrate edge portion 10 that has been detected based on the first image and the edge position B of the substrate edge portion 10 that has been detected based on the second image, the edge position A and the edge position B having been stored in the position storing unit 13. The difference storing unit 15 stores therein the difference "B−A" in the position data that has been calculated (step S310).

Figure 6:
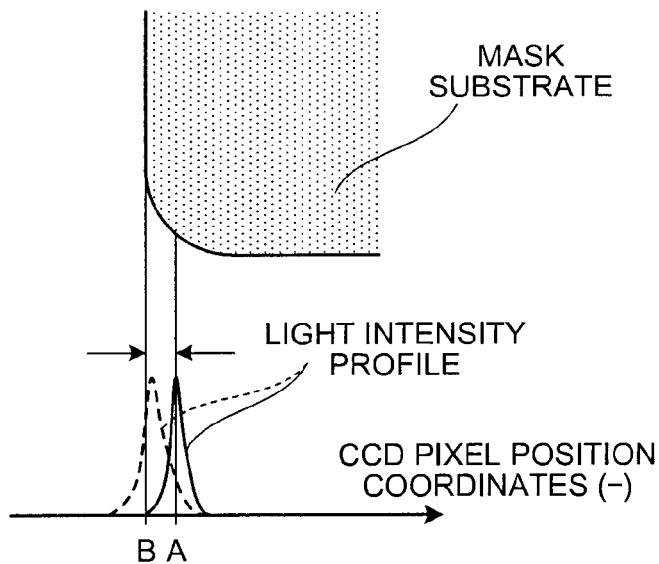
FIG. 6 is a schematic drawing for explaining a relationship between a position measured with a first illuminating device and a position measured with a second illuminating device, with respect to a cross section of a rounded edge of a substrate.

Next, the method used by the difference calculating unit 14 to calculate the difference "B−A" in the position data will be explained. In FIG. 6, the waveform in a solid line is a light intensity profile of the image taken by the CCD camera with the first illuminating device 3, whereas the waveform in a broken line is a light intensity profile of the image taken by the CCD camera with the second illuminating device 4. These light intensity profiles are also shown schematically to explain their relationship with the measured positions. The horizontal axis of the chart expresses the pixel positions of the CCD camera. In the present example, the negative (−) is shown on the right side in the coordinate system.

"A" in the drawing shows the edge position of the substrate edge portion 10 detected by using the method described above, after the measuring process is performed with the first illuminating device 3. "B" in the drawing shows the edge position of the substrate edge portion 10 detected by using the method described above, after the measuring process is performed with the second illuminating device 4. In this example, the position of "A" is on the right side (i.e., the negative side) of the position of "B". This relationship does not change no matter whether the substrate edge portion is formed by a rounded edge formation process or by a chamfered edge formation process and no matter how large the amount of the edge is. Thus, the value calculated as "B−A" is used as the difference in the position data.

Next, the significance of the difference calculating unit 14 calculating the difference in the position data will be explained. At steps S302 through S305, the first illuminating device 3 radiates the light onto the mask substrate 9 from the direction of a lateral face of the mask substrate 9, so that the image pickup device 5 takes the first image while the light is being radiated, and the position detecting unit 12 calculates the image intensity profile of the scattered light in the substrate edge portion 10 based on the first image so as to detect the position of the substrate edge portion 10. With regard to this position detecting method, a detection error analysis was made by performing a light-beam tracking simulation. As a result, we learned that there was a possibility that the detected position might be incorrect (i.e., the detected position might deviate from the correct position) depending on the shape of the substrate edge portion 10 (i.e., depending on whether the chamfered edge process or the rounded edge process being applied).

Figure 7:
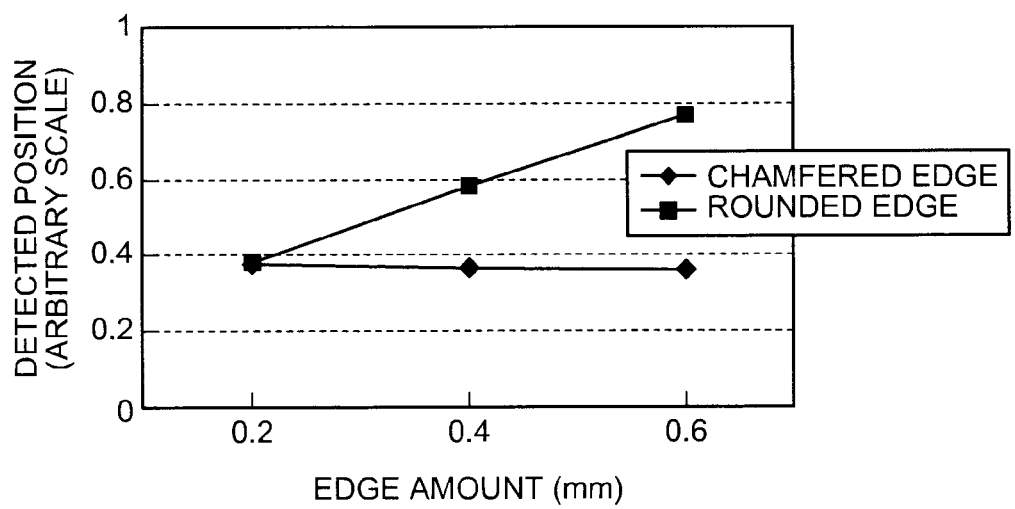
FIG. 7 is a graph for explaining a result of analysis through a light-beam tracking simulation that is performed on a detection error caused by a difference in the chamfered edge between the rounded edge.

Shown in FIG. 7 is the result of the analysis performed on cases where a rounded edge formation process is applied and a chamfered edge formation process is applied to the shape of the substrate edge portion of a mask substrate. The horizontal axis of the chart expresses the chamfered and rounded edge amount of the substrate edge portion. In compliance with a Semiconductor Equipment and Materials International (SEMI) standard related to photomask substrates, the chamfered or rounded edge amount is within a range from 0.2 millimeters to 0.6 millimeters. The vertical axis in the chart expresses the detected position of an edge image formed in the CCD camera. The unit is on an arbitrary scale. A 0.1 unit on the scale corresponds to a deviation of approximately 50 micrometers. As documents based on the SEMI standards, SEMI P1-1101 "Hard Surface Photomask Substrates" and SEMI P37-1102 "Specification for Extreme Ultraviolet Lithography Mask Substrates) have been referred to.

It is understood from FIG. 7 that the larger the rounded edge amount is, the larger the deviation of the detected position is. When a detected position obtained when R (radius) equals 0.2 millimeters is compared with a detected position obtained when R equals 0.6 millimeters, there is a deviation of approximately 0.4 units on the scale, which corresponds to a deviation of approximately 200 micrometers. It is necessary to correct the cause of the deviation error in the detected position, because the deviation exceeds the level of precision required in the first embodiment. In contrast, even if the chamfered edge amount becomes large, deviations in the detected position are substantially constant. The deviation error is expected to be smaller than 10 micrometers.

In many cases, a chamfered edge formation process is applied to the shape of the substrate edge portion of mask substrates. In these situations, the outermost part of the substrate edge portion is detected as an edge position. Thus, no such errors that influence the level of precision in the detection process occur. Consequently, it is possible to realize a position detection process with a high level of precision. To confirm this theory, the position measuring process was actually performed on mask substrates that had been manufactured by mutually-different manufacturers and had mutually-different types of films formed thereon, so that the influences of the edge shapes in the errors could be studied.

Figure 8:
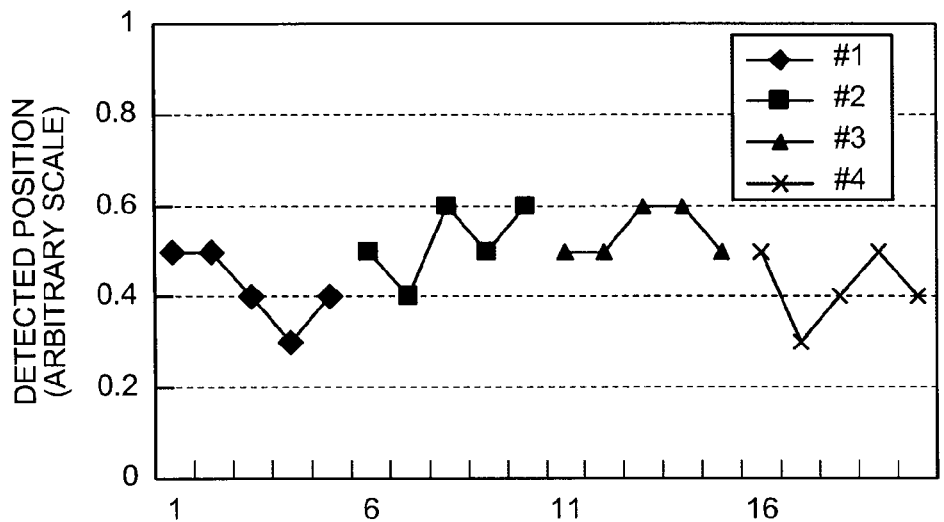
FIG. 8 is a graph for explaining results of measuring the positions of edge portions of mutually-different mask substrates.

In FIG. 8, #1 corresponds to a regular Cr mask manufactured by manufacturer A. #2 corresponds to a regular Cr mask manufactured by manufacturer B. #3 and #4 correspond to EUV masks that were manufactured by mutually-different manufacturers and on each of which a resist is formed on a tantalum (Ta) film disposed on the surface thereof. Further, #4 has an electrically-conductive film formed on the rear surface thereof. Positions were measured on five #1 substrates, five #2 substrates, and at five places in each of the sides of the #3 substrate (20 places in total), and at five places in each of the sides of the #4 substrate (20 places in total). A chamfered edge formation process had been applied to the edge portions of each of the substrates #1, #2, #3, and #4; however, because a glass grinding process had been applied, there were round surfaces (i.e., R-surfaces) on the end portions. The horizontal axis in the chart expresses the substrates #1, #2, #3, and #4. The vertical axis expresses the detected positions of the edge images formed in the CCD camera. The unit is on an arbitrary scale. A 0.1 unit on the scale corresponds to a deviation of approximately 50 micrometers.

It is understood from FIG. 8 that no matter what type of mask substrate was used, there was a deviation of approximately 0.2 units on the scale, which corresponds to a deviation of approximately 100 micrometers. The amount of this deviation is approximately half of the deviation (about 200 micrometers) resulting from a difference in the rounded edge formation process analyzed in the light-beam tracking simulation. When the amount of this deviation is compared with the result of the analysis performed on the chamfered edge formation process, the deviation is 10 times worse. It is considered that the reason is because the end portions have R-surfaces because of the glass polishing process, as mentioned above. However, these results imply that, when a chamfered edge formation process has been applied to the shape of the substrate edge portion of a mask substrate, it is possible to realize a position detection process with a higher level of precision than a case where a rounded edge formation process has been applied to the shape of the substrate edge portion.

As understood from the results shown in FIGS. 7 and 8, when a rounded edge formation process has been applied to the shape of the substrate edge portion of a mask substrate, the influence on the position detection process is not so negligible as the influence caused by a difference in the materials of which the films are formed or the structures of the films. Thus, it is necessary to realize a position detecting method that is not easily influenced by the shape of the substrate edge portion.

To achieve this goal, at steps S306 through S309, the second illuminating device 4 radiates light onto the surface of the mask substrate 9 from above the mask substrate 9, so that, based on the second image taken by the image pickup device 5, the position detecting unit 12 calculates the image intensity profile of the light in the substrate edge portion 10 at the boundary between the part through which the illumination light reaches the CCD camera and the part shadowed by the mask substrate 9 and detects the edge position B of the substrate edge portion 10. In this situation, the position of the shadow of the mask substrate 9 is not influenced by the shape of the substrate edge portion 10. Thus, there is no cause of errors resulting from the shape of the edge. Consequently, it is possible to realize a measuring process in which the level of precision is higher by as much as the absence of the cause of errors.

However, in the position measuring process performed with the first illuminating device 3 at steps S302 through S305, because the contrast of the image is high, it is assumed that the level of precision in the position detection process is extremely high. On the other hand, in the position measuring process performed with the second illuminating device 4 at steps S306 through S309, the contrast of the image is lower than the case where the first illuminating device 3 is used. Thus, it is assumed that the level of precision in the position detection process is lower than the case where the first illuminating device 3 is used. To prove these assumptions, we performed an experiment as explained below.

Figure 9:
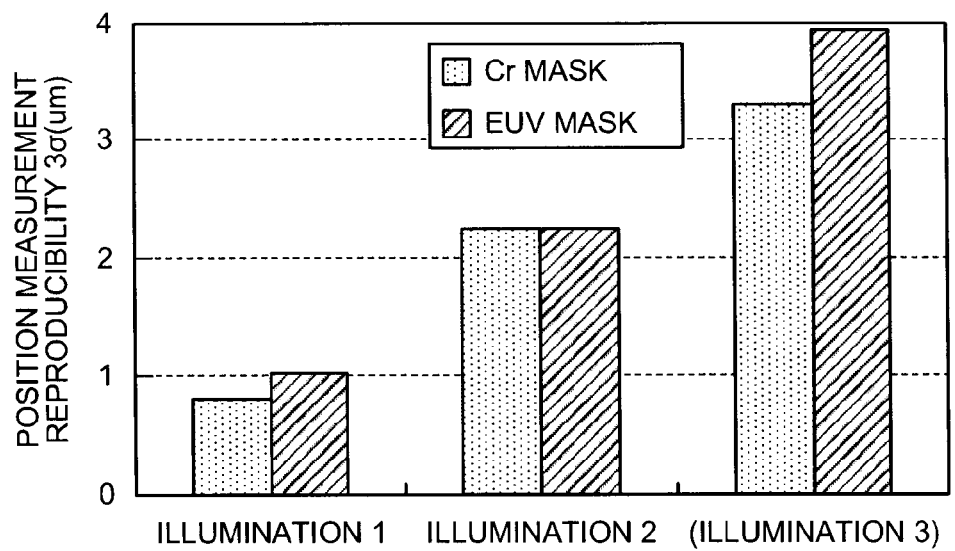
FIG. 9 is a graph for explaining a result of an experiment in which reproducibility of the position measuring process was measured under mutually-different illuminating conditions.

The vertical axis in FIG. 9 expresses position detection reproducibility represented by 3σ values of the data obtained by performing the measuring process 100 times under mutually-different illuminating conditions. The images were taken by repeatedly turning on and off the light for the measuring process each time.

The horizontal axis in FIG. 9 expresses the mutually-different illuminating conditions. The illumination 1 corresponds to the position measuring process with the first illuminating device 3 performed at steps S302 through S305. The illumination 2 corresponds to the position measuring process performed with the second illuminating device 3 performed at steps S306 through S309. The illumination 3 corresponds to a measuring process performed by using what is called a coaxial vertical illuminating method, for the purpose of making comparisons with the illuminations 1 and 2.

Figure 10:
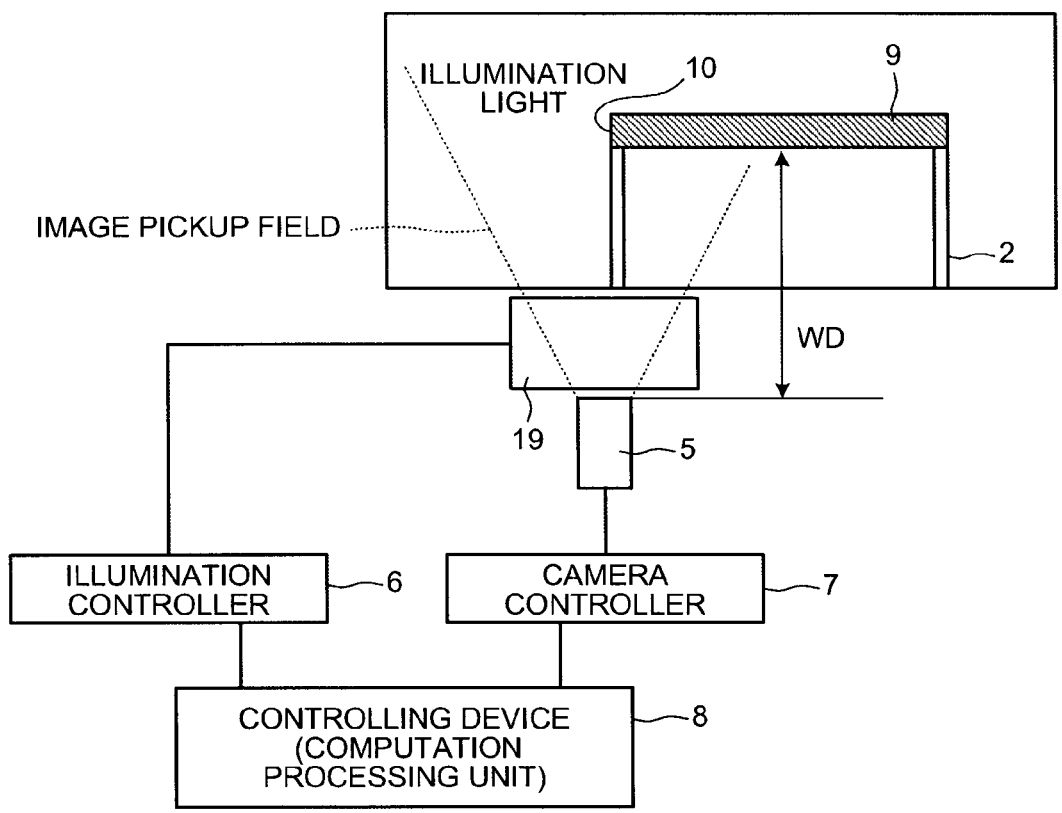
FIG. 10 is a schematic diagram of a position detecting apparatus with which a coaxial vertical illuminating method is used.

As shown in FIG. 10, in the position detecting apparatus, a coaxial vertical illuminating device 19 that provides coaxial vertical illumination is coaxially positioned with the image pickup device (CCD camera) 5 so that all the conditions including the image pickup range and the image pickup distance WD are the same.

Next, the position detecting method used in the experiment is explained below. First, the coaxial vertical illuminating device 19 radiates light onto the rear surface of the mask substrate 9 from beneath the mask substrate 9. The image pickup device 5 takes an image of the substrate edge portion 10 of the mask substrate 9 from the same direction as the radiating direction of the coaxial vertical illuminating device 19. Next, an image intensity profile of the light in the substrate edge portion 10 is calculated based on the image taken by the image pickup device 5. Further, the first derivative of the waveform of the image intensity profile of the light is calculated. After a threshold value for the intensity level is set in advance in the derivative waveform, a search is conducted from the left to the right in the derivative waveform. A position at which the derivative waveform intersects the threshold value is detected as the position of the substrate edge portion 10. The threshold value is set based on the noise level of the waveform or the like. In the present example, the threshold value is set to 30% of the maximum intensity.

A white LED was used in the illuminating device for each of the illuminations 1, 2, and 3. As the substrates of which the position was measured, a regular Cr mask and an EUV mask having an electrically-conductive film formed on the rear surface thereof were used so that dependency on the masks could be studied. A chamfered edge formation process had been applied to the edge portion of each substrate. Strictly speaking, however, although a chamfered edge formation process had been applied, there were R-surfaces on the end portions because of the glass polishing process.

As apparent from FIG. 9, the position measuring process performed with the first illuminating device 3 had a higher level of precision in the detection process than the position measuring process performed with the second illuminating device 4 and the position measuring process performed with the coaxial vertical illuminating device 19. Also, the position measuring process performed with the coaxial vertical illuminating device 19 had the lowest level of precision in the detection process, and it was understood that the coaxial vertical illuminating device 19 was not suitable for use in the position detection process. Further, it was observed that the position measuring process performed on a regular Cr mask had a slightly higher level of precision than the position measuring process performed on an EUV mask that had the electrically-conductive film formed on the rear surface thereof.

In the experiment shown in FIG. 9, a white LED was used as the illumination in each of the illuminations 1, 2, and 3. However, it is possible to improve the optical detection resolution by using, for example, a blue LED for the illumination light radiated by the second illuminating device 4 from above the mask substrate 9, because blue has a shorter wavelength. When a blue LED is used for the illumination light radiated from above the mask substrate 9, the position detection reproducibility is approximately 1.8 micrometers for both the Cr mask and the EUV mask. Thus, it has been confirmed that the level of precision is higher than the result shown in FIG. 9 (approximately 2.3 micrometers). However, the position detection reproducibility obtained when a white LED was used in the first illuminating device 3 was approximately 0.9 micrometers in the result shown in FIG. 9. Thus, the level precision was high even if the white LED was used.

To summarize, the level of precision in the position measuring detection process with the first illuminating device 3 performed at steps S302 through S305 is extremely high; however, there is a possibility that the level of precision may be influenced by the shape of the substrate edge portion. For this reason, the position measuring process is further performed with the second illuminating device 4 at steps S306 through S309. By calculating a difference between the results of the two position measuring processes, it is possible to find out whether the edge formation process applied to the substrate edge portion is a rounded edge formation process or a chamfered edge formation process, and if it is a rounded edge formation process, how large the amount of the edge is.

Further, based on the result, it is also possible to judge which one of the edge positions, namely the edge position A that has been detected by using the first illuminating device 3 and the edge position B that has been detected by using the second illuminating device 4, should be used as the position of the substrate edge portion.

Returning to the description of FIG. 3, finally, the position determining unit 16 determines the edge position of the substrate edge portion 10, and the determined-position storing unit 17 stores therein the determined edge position of the substrate edge portion 10 (step S311). Thus, the position detection process is completed. More specifically, in a case where the calculated difference "B–A" is smaller than the level of precision required in the measuring process so that there is a high possibility that the edge formation process applied to the substrate edge portion is a chamfered edge formation process, and there is no need to concern about degradation of the level of precision in the measuring process, the position determining unit 16 determines the edge position A that has been detected by using the first illuminating device 3 as the edge position of the substrate edge portion 10. Conversely, in a case where the calculated difference "B–A" is larger than the level of precision required in the measuring process so that there is a high possibility that the edge formation process applied to the substrate edge portion is an rounded edge formation process, and it is necessary to concern about degradation of the level of precision in the measuring process, the position determining unit 16 determines the edge position B that has been detected by using the second illuminating device 4 as the edge position of the substrate edge portion 10.

It is acceptable to reverse the order in which the position measuring processes are performed, namely, the process performed with the first illuminating device 3 at steps S302 through S305 and the process performed with the second illuminating device 4 at steps S306 through S309. In other words, even if the position measuring process with the first illuminating device 3 is performed after the position measuring process with the second illuminating device 4 is performed, it is possible, at step S310, for the difference calculating unit 14 to calculate a difference in the position data and for the difference storing unit 15 to store therein the calculated difference in the position data.

As explained above, when the position detecting apparatus according to the first embodiment is used, the edge position of the mask substrate is detected based on the images that are taken while the light beams are being radiated from the mutually-different directions. Thus, it is possible to determine the edge position, without being influenced by the shape of the edge portion of the mask substrate, regardless of whether a pattern has already been formed on the mask substrate. Consequently, it is possible to provide a position detecting apparatus and a position detecting method each of which has a high level of precision in the detection process.

With the position detecting apparatus according to the first embodiment, the position detection process is performed on the mask substrate over which nothing has been mounted. With a position detecting apparatus according to a second embodiment of the present invention, a position detection process is performed on a mask substrate over which a cover or a tray has been mounted.

Now, the second embodiment will be explained, with reference to the accompanying drawings. Differences between a configuration example of the position detecting apparatus according to the second embodiment and the first embodiment will be explained. The other features of the second embodiment are the same as those according to the first embodiment. Thus, the explanation above is referenced, and the explanation of the same features will be omitted.

Figure 11:
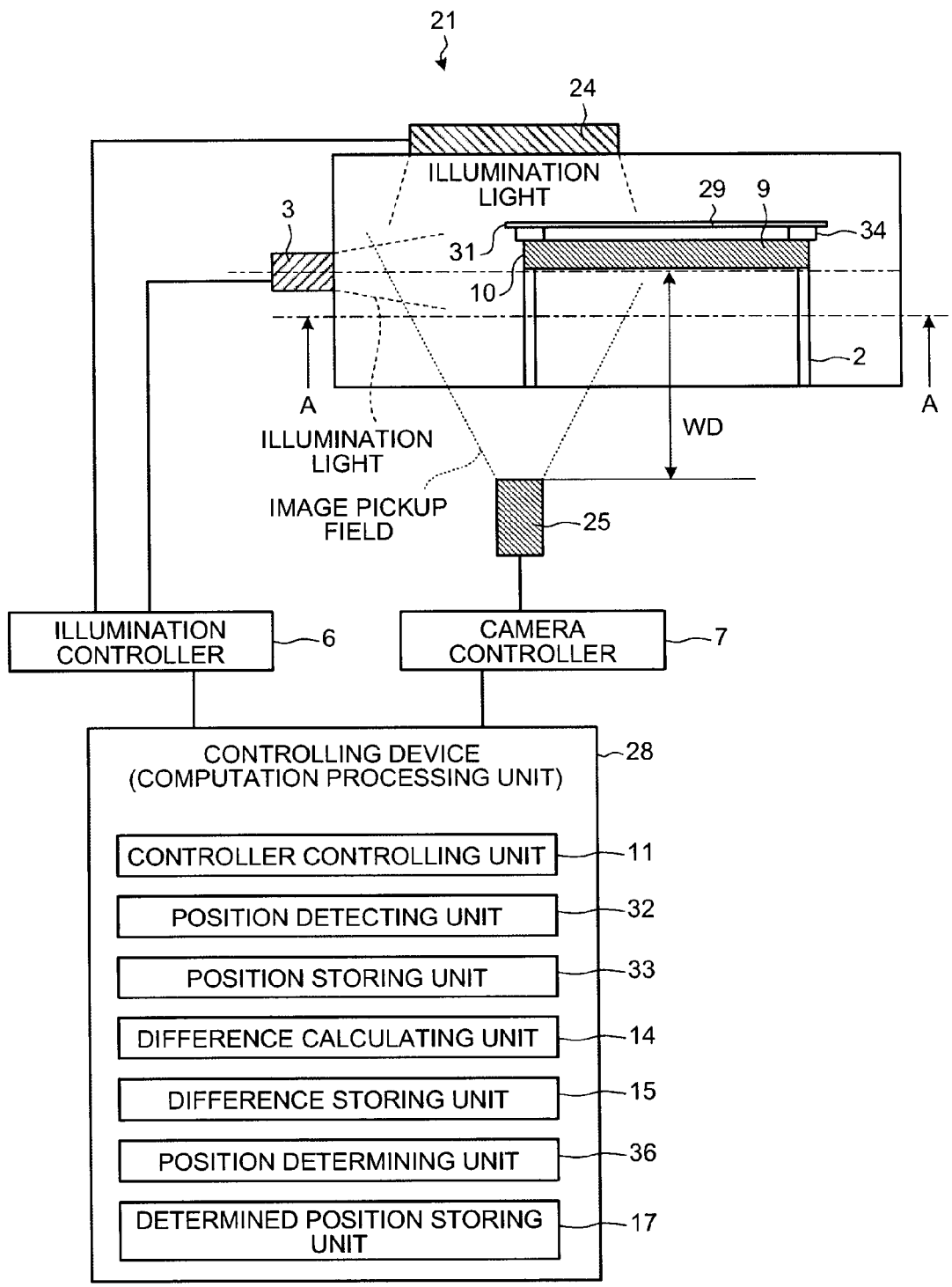
FIG. 11 is a schematic diagram of a position detecting apparatus according to a second embodiment of the present invention.
Figure 12:
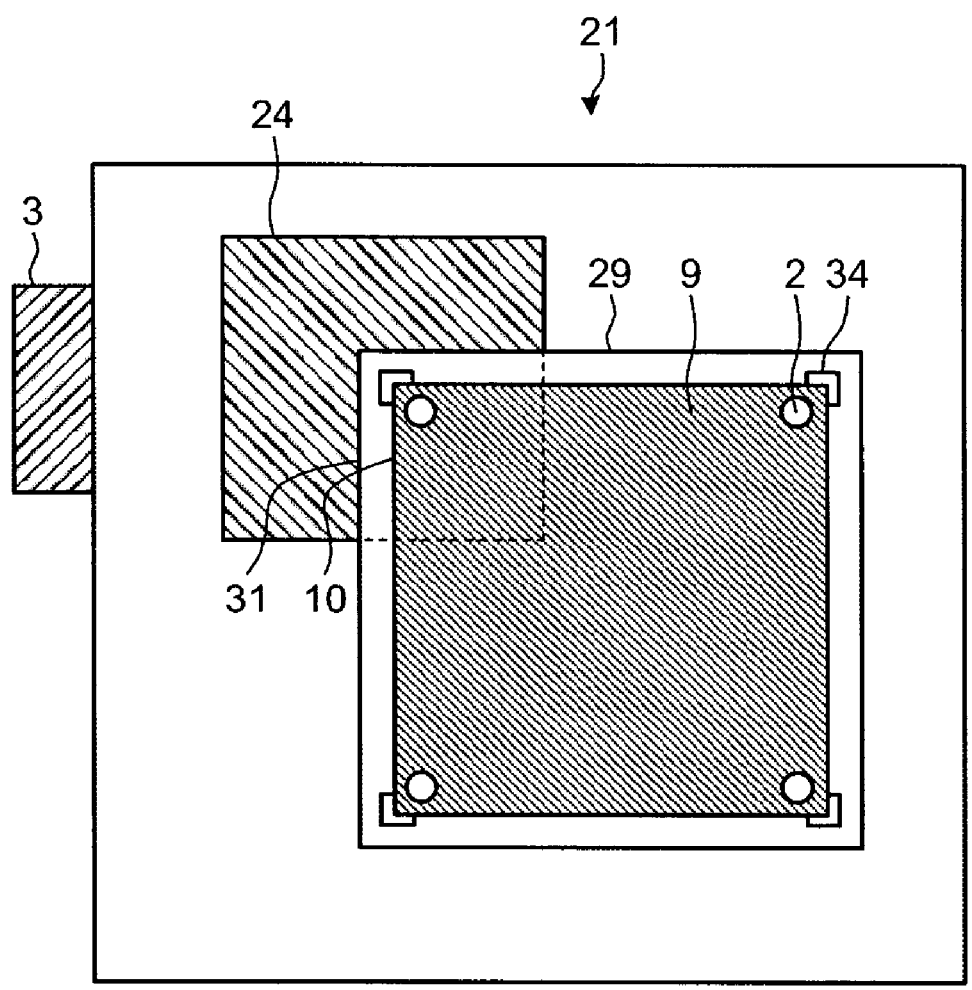
FIG. 12 is a cross-sectional view of the position detecting apparatus shown in FIG. 11 that is obtained as being viewed in the directions of the arrows A-A.

As shown in FIGS. 11 and 12, a position detecting apparatus 21 according to the second embodiment is configured so as to include: the mask-substrate supporting columns 2; the first illuminating device 3; a second illuminating device 24; an image pickup device 25; the illumination controller 6; the camera controller 7; and a controlling device (computation processing unit) 28. The configurations and the functions of the mask-substrate supporting columns 2, the first illuminating device 3, the illumination controller 6, and the camera controller 7 are the same as those in the first embodiment. Thus, the explanation thereof will be omitted.

The mask substrate 9 of which the position is to be detected is, for example, a Cr mask or an EUV mask. The mask substrate 9 may be either a mask on which a pattern has already been formed or a mask blank on which a pattern has not yet been formed. In the present example, a mask on which a pattern has already been formed will be used. The mask substrate 9 is mounted on the mask-substrate supporting columns 2 at the rear surface (i.e., the lower surface), while a cover 29 is mounted over the front surface (i.e., the upper surface) of the mask substrate 9 on which the pattern has already been formed (hereinafter, the "pattern-forming surface") or the surface on which a pattern is going to be formed. The cover 29 may be of a type that entirely covers the pattern-forming surface of the mask substrate 9 or the surface on which a pattern is going to be formed. Alternatively, the cover 29 may be of a type that entirely or partially covers the substrate edge portion 10 of the mask substrate 9.

The second illuminating device 24 is installed above the front surface of the mask substrate 9. The second illuminating device 4 has an illumination range in which not only the substrate edge portion 10 of the mask substrate 9 but also a cover edge portion 31 of the cover 29 mounted over the mask substrate 9 is sufficiently illuminated. Other configurations and functions of the second illuminating device 24 are the same as those of the second illuminating device 4 according to the first embodiment.

The image pickup device 25 takes a first image and a second image. The first image is an image taken while the light is being radiated from the first illuminating device 3. The second image is an image taken while the light is being radiated from the second illuminating device 24. The image pickup range of the image pickup device 25 includes not only the substrate edge portion 10 onto which the light is radiated from the second illuminating device 24, but also the cover edge portion 31 of the cover 29. Other configurations and functions of the image pickup device 25 are the same as those of the image pickup device 5 according to the first embodiment.

In addition to the functions of the controlling device 8 according to the first embodiment, the controlling device 28 has a function to detect the position of the cover 29 (i.e., the edge position of the cover edge portion 31), based on the second image taken by the image pickup device 25. The controlling device 28 is configured so as to include: the controller controlling unit 11; a position detecting unit 32; a position storing unit 33; the difference calculating unit 14; the difference storing unit 15; a position determining unit 36; and the determined-position storing unit 17. The configurations and the functions of the controller controlling unit 11, the difference calculating unit 14, the difference storing unit 15, and the determined-position storing unit 17 are the same as those according to the first embodiment. Thus, the explanation thereof will be omitted.

In addition to the functions of the position detecting unit 12 according to the first embodiment, the position detecting unit 32 has a function to detect the edge position of the cover edge portion 31, based on the second image taken by the image pickup device 25. In addition to the functions of the position storing unit 13 according to the first embodiment, the position storing unit 33 has a function to store therein the edge position of the cover edge portion 31 that has been detected based on the second image.

In addition to the functions of the position determining unit 16 according to the first embodiment, the position determining unit 36 has a function to calculate an edge position B by adding a difference "B–A" to an edge position A, and to determine the edge position B as the edge position of the substrate edge portion 10.

Figure 13:
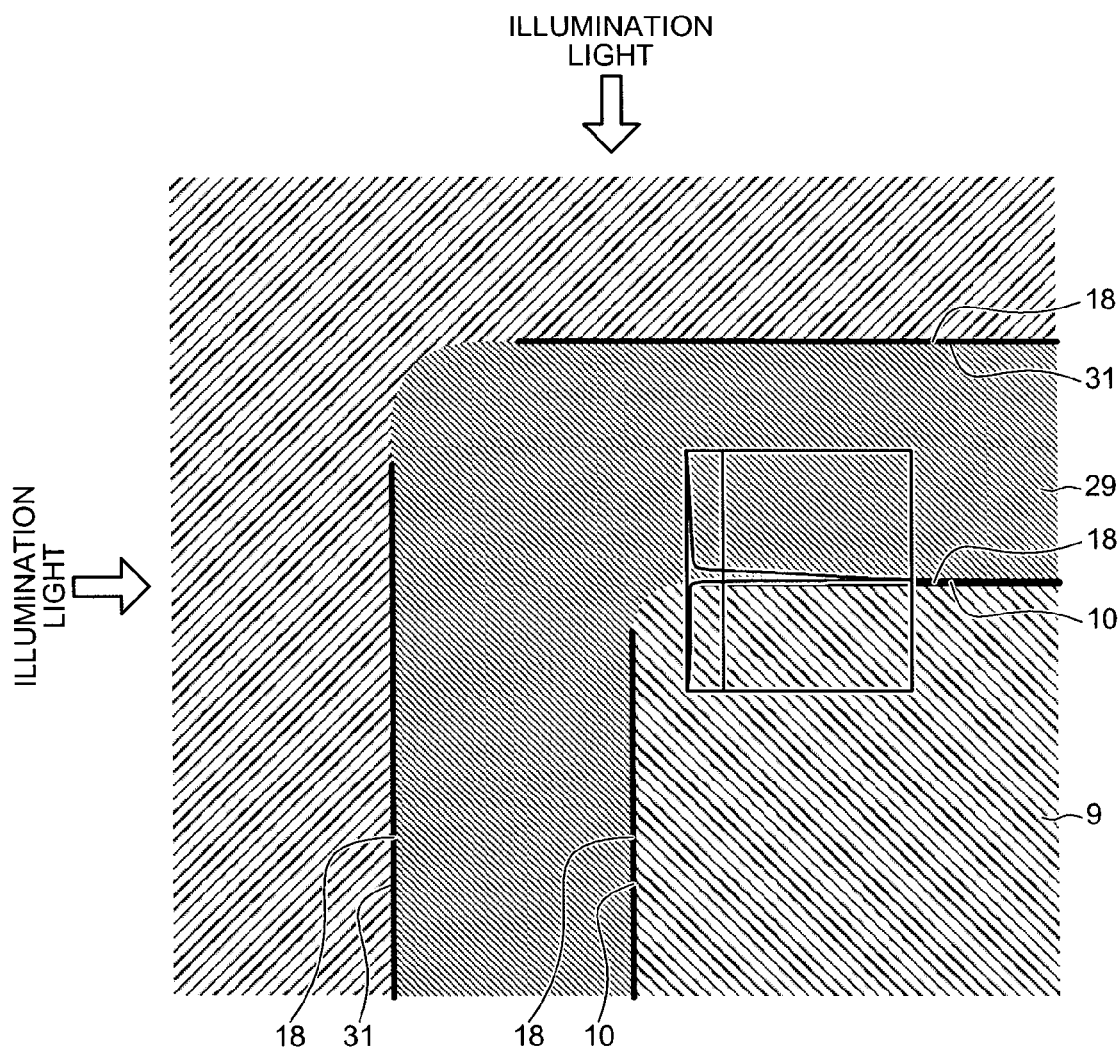
FIG. 13 is a schematic drawing of the first image taken by the image pickup device.

Shown in FIG. 13 is a situation in which two of the first illuminating devices 3 are respectively installed in two places (i.e., the upper side and the left side in the drawing) with respect to the mask substrate 9, so that light is radiated onto the mask substrate 9 from each of the first illuminating devices 3. As a result, the scattered light 18 is generated with high contrast in two places in the substrate edge portion 10 (on the upper side and the left side of the mask substrate 9) so that an image of the substrate edge portion 10 is formed. In this example, a waveform that is shown overlapping with the substrate edge portion 10 on the upper side is an image intensity profile of the scattered light. In addition, the scattered light 18 is generated in two places in the cover edge portion 31 (on the upper side and the left side of the cover 29) so that an image of the cover edge portion 31 is formed.

Accordingly, by using the position detecting method that employs the first illuminating device 3, even if the cover 29 is mounted over the mask substrate 9, while the first illuminating device 3 is radiating the light onto the mask substrate 9 from the direction of a lateral face of the mask substrate 9, the image pickup device 25 takes the first image, so that the position detecting unit 32 calculates the image intensity profile of the scattered light in the substrate edge portion 10, based on the first image. Thus, the edge position A of the substrate edge portion 10 is detected.

In the position detecting method that employs the second illuminating device 24, in the situation where the cover 29 has been mounted over the mask substrate 9, even if the second illuminating device 24 radiates light on the front surface of the substrate 9 from above the mask substrate 9, the cover 29 blocks the light. Thus, the image pickup device 25 is not able to take any image of the substrate edge portion 10. As a result, it is not possible to detect the edge position B of the substrate edge portion 10.

To cope with this situation, in the position detecting apparatus 21, before the cover 29 is mounted over the mask substrate 9, the edge position A of the substrate edge portion 10 is detected by using the first illuminating device 3, and also the edge position B of the substrate edge portion 10 is detected by using the second illuminating device 24, so that the difference "B–A" in the position data is calculated and stored in advance.

In a case where the calculated difference "B–A" is smaller than the level of precision required in the measuring process so that there is a high possibility that the edge formation process applied to the substrate edge portion is a chamfered edge formation process, and there is no need to concern about degradation of the level of precision in the measuring process, it is determined that the edge position A that has been detected by using the first illuminating device 3 is the position of the substrate edge portion 10.

However, in a case where the calculated difference "B–A" is larger than the level of precision required in the measuring process so that there is a high possibility that the edge formation process applied to the substrate edge portion is a rounded edge formation process, and it is necessary to concern about degradation of the level of precision in the measuring process, the edge position B of the substrate edge portion 10 is calculated by adding the stored difference "B–A" in the position data to the edge position A of the substrate edge portion 10 that has been detected by using the first illuminating device 3 while the cover 29 is being mounted over the mask substrate 9. Thus, the edge position B is determined as the edge position of the substrate edge portion 10.

Figure 14A:
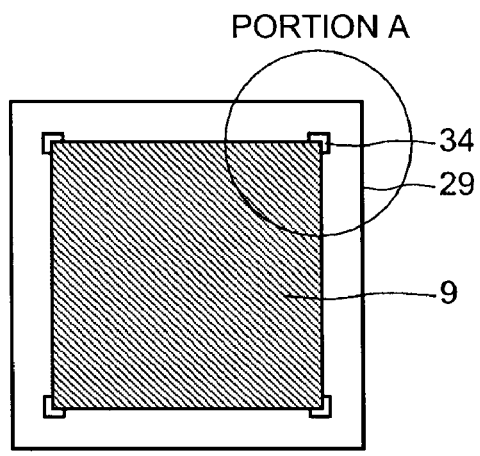
FIG. 14A is a schematic drawing illustrating the shape of pads provided on a cover.
Figure 14B:
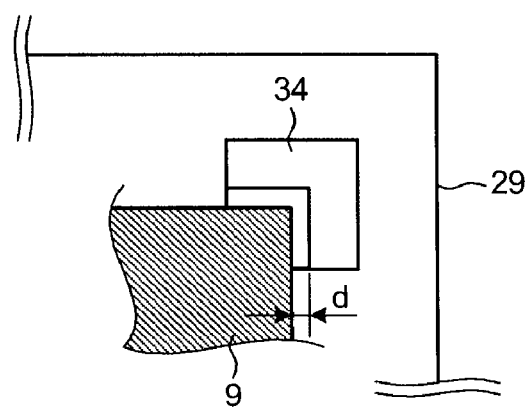
FIG. 14B is a plan view illustrating the shape of pads provided on a cover that is obtained by enlarging the circle A shown in FIG. 14A.
Figure 14C:
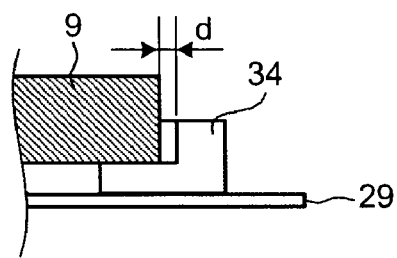
FIG. 14C is a side view illustrating the shape of pads provided on a cover that is obtained by enlarging the circle A shown in FIG. 14A.

Next, how the cover 29 is mounted over the mask substrate 9 will be explained more specifically. As shown in FIGS. 14A to 14C, the cover 29 is in contact with the mask substrate 9 via pads 34, which are constituent elements of the cover 29. Each of the pads 34 is configured so as to have a mound that is positioned a little distance from the lateral faces of the mask substrate 9 when the cover 29 is properly mounted over the mask substrate 9. When the cover 29 is properly mounted over the mask substrate 9, there is an allowance of a distance "d" between lateral faces of the mound portion of each of the pads 34 and the lateral faces of the mask substrate 9 so that the mask substrate 9 is not in contact with the mound portion. Even if the cover 29 is no longer properly mounted over the mask substrate 9 due to vibrations or the like, the mound portions ensure that the cover 29 does not fall off the mask substrate 9. If the mask substrate 9 touches any of the mound portions of the pads 34 during the process of mounting the cover 29 over the mask substrate 9, particles will occur. Thus, it is necessary to mount the cover 29 over the mask substrate 9 after the cover 29 is accurately positioned with respect to the mask substrate 9. During this positioning process, by detecting the position of the mask substrate 9 and the position of the cover 29 by using the configuration of the position detecting apparatus according to the second embodiment, it is possible to prevent the mask substrate 9 from being in contact with the mound portions of the pads 34.

It is possible to detect the position of the mask substrate 9 by using the method described above. Also, it is possible to detect the position of the cover 29 by using a method described below. The distance between the image pickup device 25 and the cover 29 is adjusted so as to be the image pickup distance (WD), and the camera in the image pickup device 5 is focused on the lower surface of the cover 29. With this arrangement, while the second illuminating device 24 is radiating light on the upper surface of the cover 29 from above the cover 29, the image pickup device 25 is able to take the second image, so that the position detecting unit 32 calculates an image intensity profile of the light in the cover edge portion 31, based on the second image. Thus, the position of the cover edge portion 31 is detected.

In the explanation above, the distance between the image pickup device 25 and the cover 29 is adjusted so as to be the image pickup distance (WD). However, it is possible to perform the edge measuring process with a sufficiently high level of precision, even if the image pickup distance (WD) remains to be on the lower surface of the mask substrate, as long as the distance is within the range of the focus depth of the lens. Because the focus depth of the lens used in the present example is approximately 10 millimeters and is sufficiently larger than the thickness of a regular photomask substrate (i.e., 6.35 millimeters), there will be no problem. Also, the WD for the mask substrate 9 is different from the WD for the cover 29. Thus, strictly speaking, the distance per camera pixel is different from each other. However, there will be no problem because it is possible to calculate a deviation in the positions by setting the distance per pixel for each of the mask substrate 9 and the cover 29.

A positional-relationship judging unit (not shown) included in the controlling device 28 is able to judge, based on the position of the mask substrate 9 and the position of the cover 29 that have been detected, whether the positional relationship between them is within a tolerable range. Further, another arrangement is acceptable in which the positional-relationship judging unit judges the positional relationship between the mask substrate 9 and the cover 29 before the cover 29 is mounted over the mask substrate 9, so that the cover 29 is mounted over the mask substrate 9 only if the positional-relationship judging unit has judged that the positional relationship is within the tolerable range. The level of precision for the detected position of the cover edge portion 31 is lower than the level of precision for the determined position of the substrate edge portion 10 of the mask substrate 9. However, because there is an allowance of the distance "d" between the lateral faces of the mound portion of each of the pads 34 of the cover 29 and the lateral faces of the mask substrate 9, there will be no substantial problem.

As explained above, when the position detecting apparatus according to the second embodiment is used, even if a cover is to be mounted over the mask substrate, the edge position of the mask substrate before the cover is mounted thereon is detected, in advance, based on the images that are taken while the light beams are being radiated from the mutually-different directions. Thus, it is possible to determine the edge position without being influenced by the shape of the edge portion of the mask substrate, regardless of whether a pattern has already been formed on the mask substrate. Consequently, it is possible to provide a position detecting apparatus and a position detecting method each of which has a high level of precision in the detection process.

In addition, when the position detecting apparatus according to the second embodiment is used, it is possible to detect the edge position of the cover mounted over the mask substrate, based on the image that is taken while the light is being radiated thereon. Thus, it is possible to provide a position detecting apparatus and a position detecting method each of which enables a user to accurately understand the positional relationship between the mask substrate and the cover.

The position detecting apparatus according to the second embodiment detects the position of the mask substrate over which a cover or a tray has been mounted. A position detecting apparatus according to a third embodiment of the present invention detects the position of a mask substrate that is mounted over a cover or a tray.

Now, the third embodiment will be explained with reference to the accompanying drawings. Differences between a configuration example of the position detecting apparatus according to the third embodiment and the first embodiment will be explained. The other features of the third embodiment are the same as those of the first embodiment. Thus, the explanation above is referenced, and the explanation of the same features will be omitted.

Figure 15:
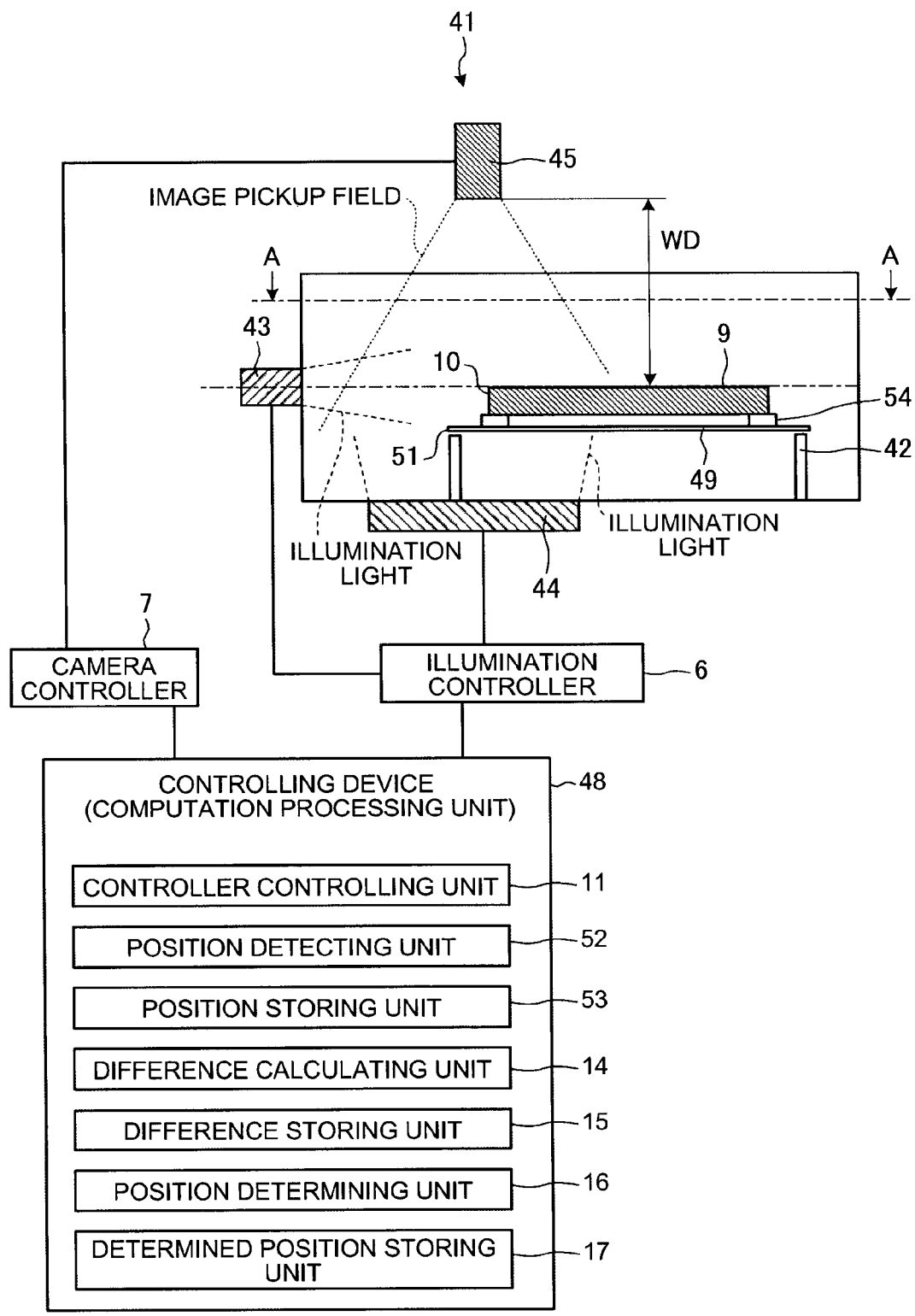
FIG. 15 is a diagram of a position detecting apparatus according to a third embodiment of the present invention.
Figure 16:
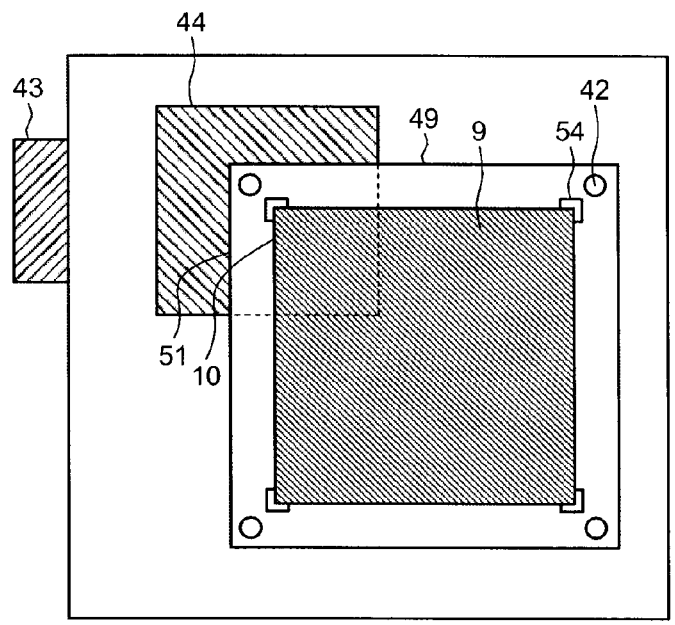
FIG. 16 is a cross-sectional view of the position detecting apparatus shown in FIG. 15 that is obtained as being viewed in the directions of the arrows A-A.

As shown in FIGS. 15 and 16, a position detecting apparatus 41 according to the third embodiment is configured so as to include: a cover supporting columns 42; a first illuminating device 43; a second illuminating device 44; an image pickup device 45; the illumination controller 6; the camera controller 7; and a controlling device (computation processing unit) 48. The configurations and the functions of the illumination controller 6 and the camera controller 7 are the same as those in the first embodiment. Thus, the explanation thereof will be omitted.

Basically, the position detecting apparatus 41 according to the third embodiment is obtained by placing the configuration of the position detecting apparatus 21 according to the second embodiment upside down. The mask substrate 9 of which the position is to be detected is mounted over the cover 49. Further, the cover 49 is mounted on the cover supporting columns 42. The mask substrate 9 is, for example, a Cr mask or an EUV mask. The mask substrate 9 may be either a mask on which a pattern has already been formed or a mask blank on which a pattern has not yet been formed. In the present example, a mask on which a pattern has already been formed will be used. The front surface (i.e., the lower surface) of the mask substrate 9, which is the pattern-forming surface or the surface on which a pattern is going to be formed, is facing the cover 49. The cover 49 covers only a part of the substrate edge portion 10 of the mask substrate 9, not the entire substrate edge portion 10.

The first illuminating device 43 is installed so that the rear surface (i.e., the upper surface) of the mask substrate 9 and a radiation center of the first illuminating device 43 are positioned on substantially the same plane. Other configurations and functions of the first illuminating device 43 are the same as those of the first illuminating device 3 according to the first embodiment.

The second illuminating device 44 radiates light in a direction substantially perpendicular to the front surface of the mask substrate 9 from beneath the front surface of the mask substrate 9. Thus, the second illuminating device 44 is installed beneath the front surface of the mask substrate 9 and has an illumination range in which not only the substrate edge portion 10 of the mask substrate 9 but also a cover edge portion 51 of the cover 49 over which the mask substrate 49 is mounted is sufficiently illuminated. Other configurations and functions of the second illuminating device 44 are the same as those of the second illuminating device 4 according to the first embodiment.

The image pickup device 45 takes a first image and a second image. The first image is an image taken while the light is being radiated from the first illuminating device 43. The second image is an image taken while the light is being radiated from the second illuminating device 44. Thus, the image pickup device 45 is installed above the rear surface of the mask substrate 9 by being fixed by a camera support (not shown). The image pickup range of the image pickup device 45 includes not only the substrate edge portion 10 onto which the light is radiated from the second illuminating device 44 but also the cover edge portion 51 of the cover 49. Other configurations and functions of the image pickup device 45 are the same as those of the image pickup device 5 according to the first embodiment.

In addition to the functions of the controlling device 8 according to the first embodiment, the controlling device 48 has a function to detect the position of the cover 49 (i.e., the edge position of the cover edge portion 51), based on the second image taken by the image pickup device 45. The controlling device 48 is configured so as to include: the controller controlling unit 11; a position detecting unit 52; a position storing unit 53; the difference calculating unit 14; the difference storing unit 15; the position determining unit 16; and the determined-position storing unit 17. The configurations and the functions of the controller controlling unit 11, the difference calculating unit 14, the difference storing unit 15, the position determining unit 16, and the determined-position storing unit 17 are the same as those according to the first embodiment. Thus, the explanation thereof will be omitted.

In addition to the functions of the position detecting unit 12 according to the first embodiment, the position detecting unit 52 has a function to detect the edge position of the cover edge portion 51, based on the second image taken by the image pickup device 45. In addition to the functions of the position storing unit 13 according to the first embodiment, the position storing unit 53 has a function to store therein the edge position of the cover edge portion 51 that has been detected based on the second image.

Accordingly, by using the position detecting method that employs the first illuminating device 43, even if the mask substrate 9 is mounted over the cover 49, while the first illuminating device 43 is radiating the light onto the mask substrate 9 from the direction of a lateral face of the mask substrate 9, the image pickup device 45 takes the first image, so that the position detecting unit 52 calculates the image intensity profile of the scattered light in the substrate edge portion 10, based on the first image. Thus, the edge position A of the substrate edge portion 10 is detected.

The cover 49 has a cut-out or a window (not shown) in a part through which the second illuminating device 44 radiates the light onto the front surface of the mask substrate 9 from beneath the front surface of the mask substrate 9. Thus, even if the mask substrate 9 is mounted over the cover 49, it is possible to detect the edge position B of the substrate edge portion 10 by using the position detecting method that employs the second illuminating device 44. In other words, when the second illuminating device 44 radiates the light toward the front surface of the mask substrate 9 from beneath the front surface of the mask substrate 9, part of the light reaches the front surface of the mask substrate 9 that includes the substrate edge portion 10 through the cut-out or the window provided in the cover 49. In this state, the image pickup device 45 takes the second image so that the position detecting unit 52 calculates the image intensity profile of the light in the substrate edge portion 10 based on the second image. Thus, the edge position B of the substrate edge portion 10 is detected.

Next, how the mask substrate 9 is mounted over the cover 49 will be explained more specifically. The cover 49 is in contact with the mask substrate 9 via pads 54, which are constituent elements of the cover 49. Each of the pads 54 has substantially the same shape as each of the pads 34 according to the second embodiment. Each of the pads 54 is configured so as to have a mound that is positioned a little distance from the lateral faces of the mask substrate 9 when the mask substrate 9 is properly mounted. When the mask substrate 9 is properly mounted, the mask substrate 9 is not in contact with the mound portions. Even if the mask substrate 9 is no longer properly mounted over the cover 49 due to vibrations or the like, the mound portions ensure that the mask substrate 9 does not fall off the cover 49. If the mask substrate 9 touches any of the mound portions of the pads 54 during the process of mounting the mask substrate 9 over the cover 49, particles will occur. Thus, it is necessary to mount the mask substrate 9 over the cover 49 after the mask substrate 9 is accurately positioned with respect to the cover 49. During this positioning process, by measuring the position of the mask substrate 9 and the position of the cover 49 by using the configuration of the position detecting apparatus according to the third embodiment, it is possible to prevent the mask substrate 9 from being in contact with the mound portions of the pads 54.

It is possible to detect the position of the mask substrate 9 by using the method described above. Also, it is possible to detect the position of the cover 49 by using a method described below. The distance between the image pickup device 45 and the cover 49 is adjusted so as to be the image pickup distance (WD), and the camera in the image pickup device 45 is focused on the upper surface of the cover 49. With this arrangement, when the second illuminating device 44 radiates light on the lower surface of the cover 49 from beneath the cover 49, part of the light is radiated on the surface of the cover 49 that includes the cover edge portion 51. In this state, the image pickup device 45 takes the second image, so that the position detecting unit 52 calculates an image intensity profile of the light in the cover edge portion 51, based on the second image. Thus, the position of the cover edge portion 51 is detected.

The adjustments of the distance between the image pickup device 45 and the cover 49 as well as the image pickup distance (WD), the focus depth of the lens, and the distance per camera pixel are the same as those explained in the description of the second embodiment.

A positional-relationship judging unit (not shown) included in the controlling device 48 is able to judge, based on the position of the mask substrate 9 and the position of the cover 49 that have been detected, whether the positional relationship between them is within a tolerable range. Further, another arrangement is acceptable in which the positional-relationship judging unit judges the positional relationship between the mask substrate 9 and the cover 49 before the mask substrate 9 is mounted over the cover 49, so that the mask substrate 9 is mounted over the cover 49 only if the positional-relationship judging unit has judged that the positional relationship is within the tolerable range.

As explained above, when the position detecting apparatus according to the third embodiment is used, even if the mask substrate is mounted over the cover, it is possible to determine the edge position without being influenced by the shape of the edge portion of the mask substrate by detecting the edge position of the mask substrate based on the images taken while the light beams are being radiated from the mutually-different directions, regardless of whether a pattern has already been formed on the mask substrate. Consequently, it is possible to provide a position detecting apparatus and a position detecting method each of which has a high level of precision in the detection process.

In addition, when the position detecting apparatus according to the third embodiment is used, it is possible to detect the edge position of the cover over which the mask substrate is mounted, based on the image that is taken while the light is being radiated thereon. Thus, it is possible to provide a position detecting apparatus and a position detecting method each of which enables a user to accurately understand the positional relationship between the mask substrate and the cover.

According to a fourth embodiment, the position detecting apparatus according to any one of the first to the third embodiments is applied to a cover mounting device that mounts a cover over the mask substrate.

Figure 17:
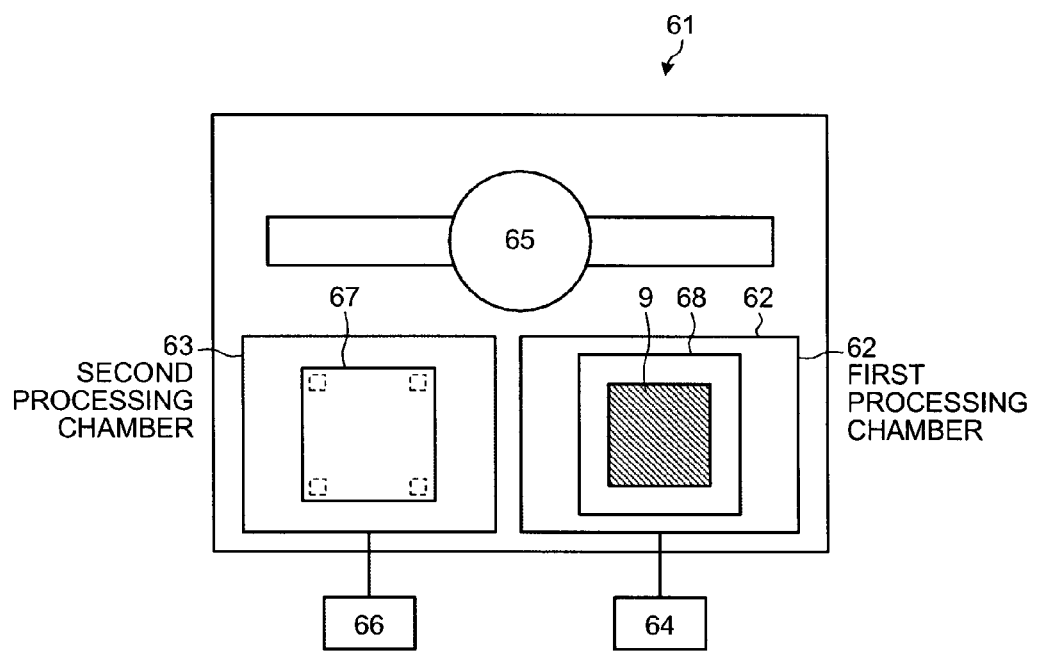
FIG. 17 is a schematic drawing of a cover mounting device according to a fourth embodiment of the present invention.

Now, the fourth embodiment will be explained with reference to the accompanying drawings. As shown in FIG. 17, a cover mounting device 61 is configured so as to include a first processing chamber 62, a second processing chamber 63, a mask-pod open-close mechanism 64, a transporting robot 65, and a cover mounting mechanism 66.

Next, a schematic flow of the procedure performed by the cover mounting device 61 to mount a cover 67 over the mask substrate 9 will be explained. The mask substrate 9 is housed, in advance, in a mask pod 68 within the first processing chamber 62. The cover 67 is stored in the second processing chamber 63. The mask substrate 9 is, for example, a Cr mask or an EUV mask. The mask substrate 9 may be either a mask on which a pattern has already been formed or a mask blank on which a pattern has not yet been formed. In the present example, a mask on which a pattern has already been formed will be used. First, the mask-pod open-close mechanism 64 provided in the first processing chamber 62 opens the mask pod 68. Then, the transporting robot 65 takes the mask substrate 9 out of the mask pod 68 and carries out the mask substrate 9 from the first processing chamber 62. Further, the transporting robot 65 carries the mask substrate 9 into the second processing chamber 63 and mounts the mask substrate 9 onto the cover mounting mechanism 66 provided in the second processing chamber 63.

Subsequently, the cover mounting mechanism 66 mounts the cover 67 over the mask substrate 9. The transporting robot 65 carries out, again, the mask substrate 9 over which the cover 67 is mounted from the second processing chamber 63 and carries the mask substrate 9 with the cover 67 into the first processing chamber 62, so as to put the mask substrate 9 with the cover 67 into the mask pod 68. Lastly, the mask-pod open-close mechanism 64 closes the mask pod 68.

The mask pod 68 that houses therein the mask substrate 9 over which the cover 67 is mounted is transported to another apparatus such as an exposure apparatus by, for example, an Automated Guided Vehicle (AGV). In this manner, it is possible to transport the mask over which the cover is mounted to another apparatus.

Figure 18A:
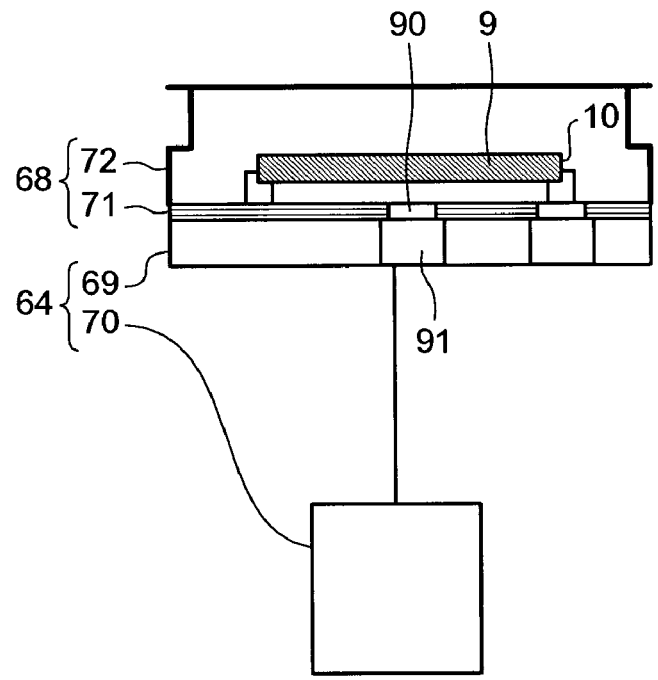
FIGS. 18A and 18B are schematic drawings of a method for opening and closing a mask pod, the method being used by a mask-pod open-close mechanism.
Figure 18B:
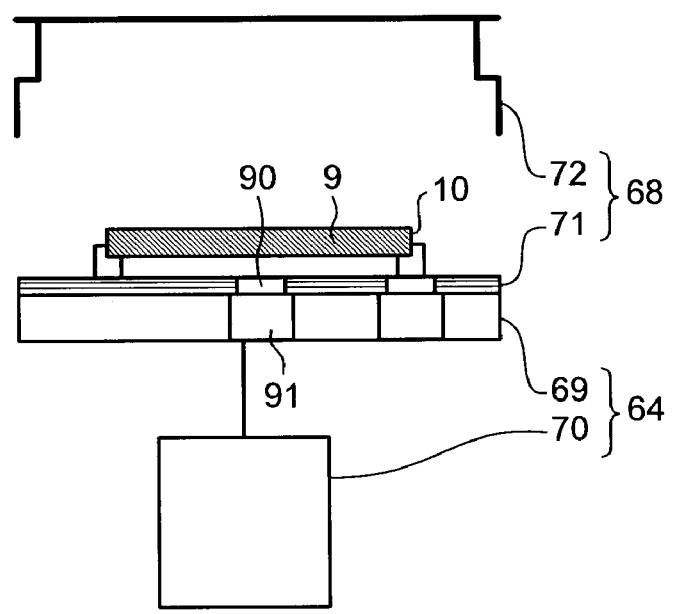

As shown in FIGS. 18A and 18B, the mask-pod open-close mechanism 64 is configured so as to include a table 69 and an elevator 70. Basically, the mask-pod open-close mechanism 64 is a mechanism that uses the same method as the Standard Mechanical Interface (SMIF) method. The mask pod 68 is configured so as to include a pod bottom 71 and a pod lid 72. The mask substrate 9 is stored while being mounted on the pod bottom 71 and further being covered by the pod lid 72. The pattern-forming surface (i.e., the upper surface) of the mask substrate 9 is positioned on the upper side of the drawing. The pod lid 72 is made of a transparent substance, for example, an antistatic resin. The pod bottom 71 has two windows 90, whereas the table 69 has two openings 91. The windows 90 and the openings 91 are necessary in the position detection process. They will be explained in detail in the description of a first position detecting apparatus.

Shown in FIG. 18A is a state in which the mask pod 68 is closed by the mask-pod open-close mechanism 64. In the drawing, the table 69 has been raised by the elevator 70, so that the pod bottom 71 mounted on the table 69 is in contact with the pod lid 72. The pod bottom 71 and the pod lid 72 are interlocked with each other by a locking mechanism (not shown), when they come into contact with each other.

Shown in FIG. 18B is a state in which the mask pod 68 is opened by the mask-pod open-close mechanism 64. In the drawing, the table 69 has been lowered by the elevator 70, so that the pod bottom 71 mounted on the table 69 is separated from the pod lid 72. The interlock between the pod bottom 71 and the pod lid 72 is released by an opener (not shown) when they separate from each other. Accordingly, due to the operation of the elevator 70 to raise and lower the table 69, the mask pod 68 is opened and closed.

Figure 19A:
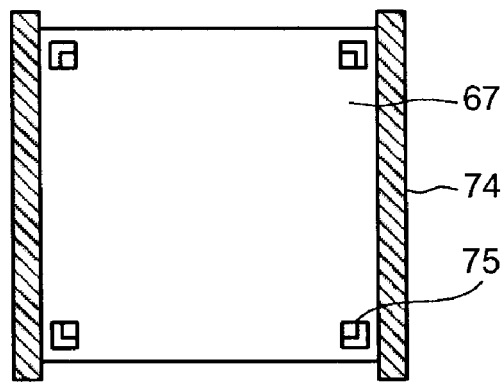
FIG. 19A is a bottom view of a method for attaching a cover to a mask substrate, the method being used by a cover mounting mechanism.
Figure 19B:
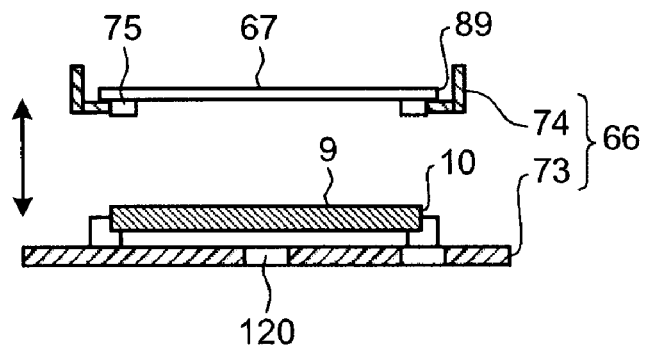
FIGS. 19B and 19C are side views of a method for attaching a cover to a mask substrate, the method being used by a cover mounting mechanism.
Figure 19C:
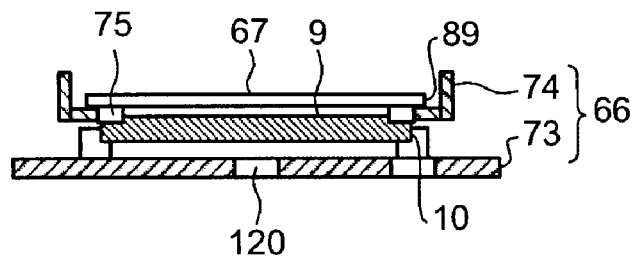

As shown in FIGS. 19A to 19C, the cover mounting mechanism 66 is configured so as to include a mask supporting stage 73, cover mounting hands 74, and a biaxial driving system (not shown). The cover 67 has pads 75. Each of the pads 75 has the same shape as each of the pads 34 according to the second embodiment and each of the pads 54 according to the third embodiment. Each of the pads 75 has a mound in a perimeter portion thereof.

Shown in FIG. 19B is a state before the cover mounting mechanism 66 mounts the cover 67 over the mask substrate 9, as being viewed from a lateral face of the cover 67. Show in FIG. 19A is the same state as being viewed from the bottom of the cover 67. In the drawing, the mask substrate 9 is mounted on the mask supporting stage 73. The cover 67 is positioned above the mask substrate 9 while being held by the cover mounting hands 74. The pattern-forming surface (i.e., the upper surface) of the mask substrate 9 is positioned on the upper side of the drawing. The cover mounting hands 74 have been moved to this position by the biaxial driving system (not shown). The mask supporting stage 73 has two windows 120. These windows 120 are necessary in the position detection process. They will be explained in detail in the description of a second position detecting apparatus.

Shown in FIG. 19C is a state after the cover mounting mechanism 66 has mounted the cover 67 over the mask substrate 9, as being viewed from the lateral face of the cover 67. In this drawing, the cover mounting hands 74 have been lowered so that the cover 67 held by the cover mounting hands 74 is mounted over the mask substrate 9 while the pads 75 are interposed therebetween. Accordingly, the cover mounting mechanism 66 mounts the cover 67 over the mask substrate 9 by lowering the cover mounting hands 74 with the biaxial driving system (not shown). In addition, the cover mounting mechanism 66 is also operable to detach the cover 67 from the mask substrate 9 by raising the cover mounting hands 74 with the biaxial driving system (not shown).

Further, a first position detecting apparatus 81 according to any one of the first to the third embodiments is provided in the first processing chamber 62.

Figure 21:
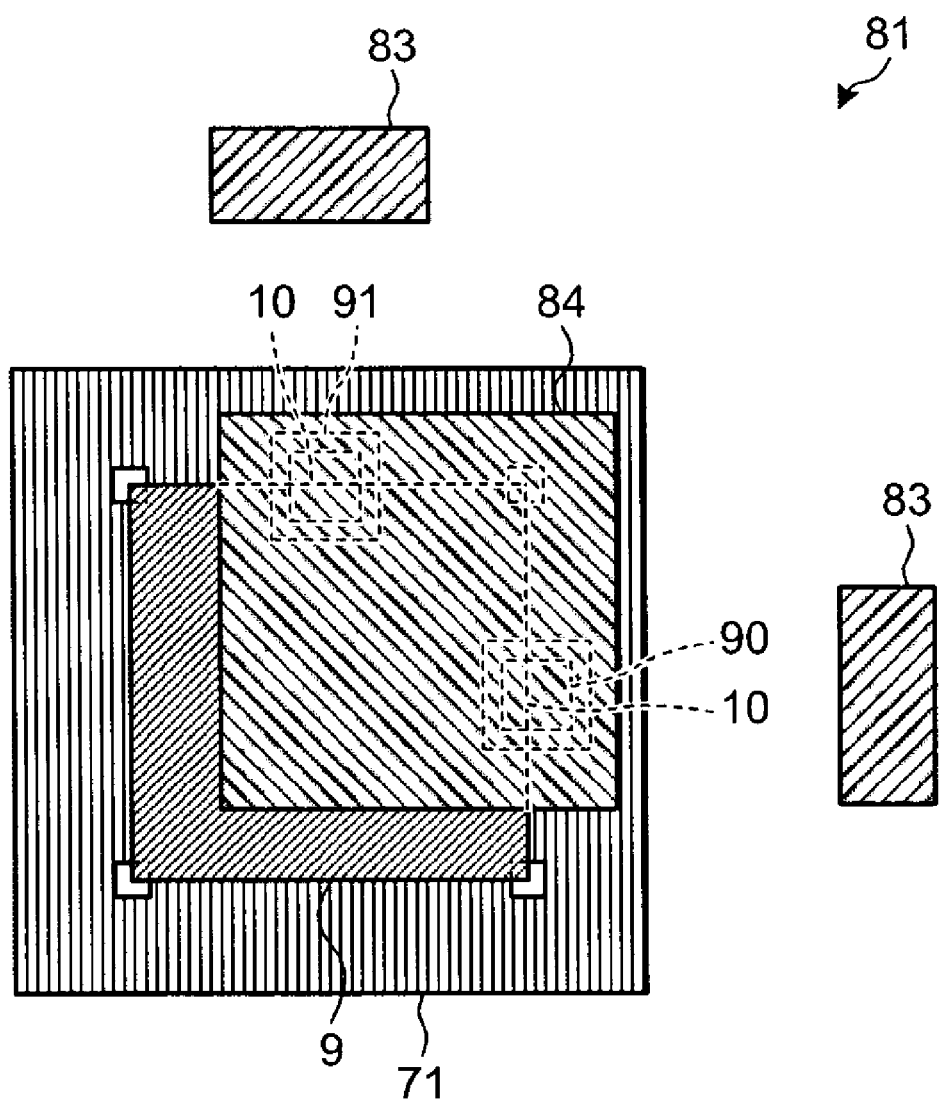
FIG. 21 is a top view of the first position detecting apparatus in the first processing chamber before the cover is mounted over the mask substrate.
Figure 22:
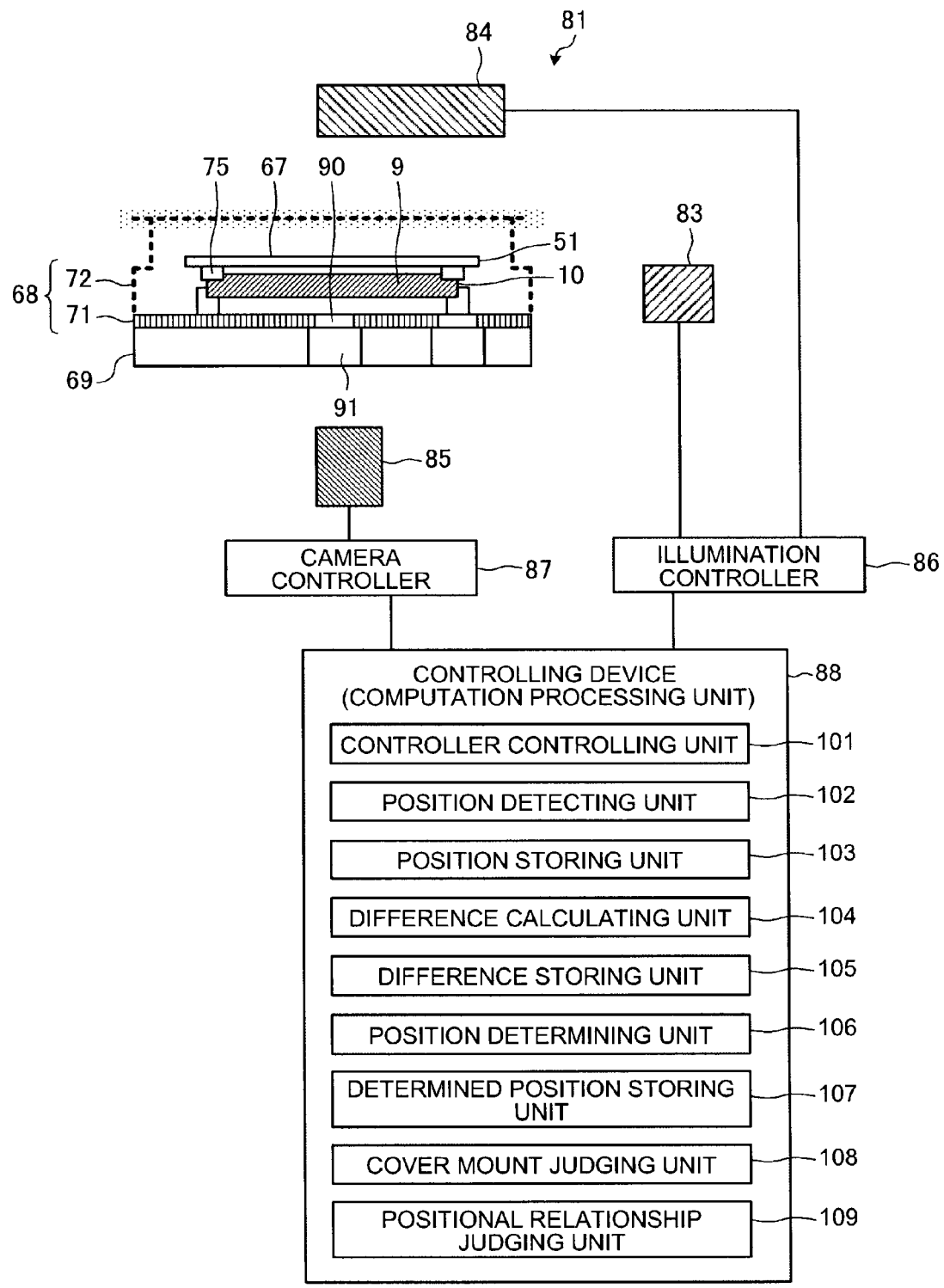
FIG. 22 is a side view of a first position detecting apparatus in a first processing chamber after a cover is mounted over a mask substrate.

As shown in FIGS. 20 to 22, the first position detecting apparatus 81 according to the fourth embodiment is configured so as to include: a first illuminating device 83, a second illuminating device 84, an image pickup device 85, an illumination controller 86, a camera controller 87, and a controlling device (computation processing unit) 88. As understood from FIG. 20, the mask pod 68 is closed, and the pod bottom 71 is mounted on the table 69. The mask substrate 9 is stored while being mounted on the pod bottom 71 and further being covered by the pod lid 72.

The first illuminating device 83 radiates light in a direction substantially parallel to the front and the rear surfaces of the mask substrate 9 from a lateral face thereof. The illumination light has an intensity distribution spreading, in an up-and-down direction, in a range that is larger than the thickness of the mask substrate 9. Thus, the first illuminating device 83 is installed so that the lower surface of the mask substrate 9 and a radiation center of the first illuminating device 83 are positioned on substantially the same plane. Two of the first illuminating devices 83 are installed in two places, respectively, so that two sides of the mask substrate 9 are illuminated.

A second illuminating device 84 radiates light in a direction substantially perpendicular to the upper surface of the mask substrate 9 from above the upper surface of the mask substrate 9. Thus, the second illuminating device 84 is installed above the upper surface of the mask substrate 9 and has an illumination range in which not only the substrate edge portion 10 of the mask substrate 9, but also a cover edge portion 89 of the cover 67 is sufficiently illuminated, in a situation where the cover 67 is mounted over the mask substrate 9. In the present example, LEDs are used in the first illuminating device 83 and the second illuminating device 84.

The image pickup device 85 takes a first image and a second image. The first image is an image taken while the light is being radiated from the first illuminating device 83. The second image is an image taken while the light is being radiated from the second illuminating device 84. Thus, the image pickup device 85 is installed beneath the lower surface of the table 69 by being fixed by a camera support (not shown). A CCD camera can be used as the image pickup device 85.

The pod bottom 71 has the two transparent windows 90 in two positions, respectively. One of the two positions is a position that includes two places in the substrate edge portion 10 of the mask substrate 9 in which scattered light is generated with high contrast when the first illuminating device 83 radiates the light. The other of the two positions is a position that includes two places in the substrate edge portion 10 that are at the boundary between the part through which the light passes and the part shadowed by the mask substrate 9 when the second illuminating device 84 radiates the light and two places in the cover edge portion 89 that are at the boundary between the part through which the light passes and the part shadowed by the cover 67. Further, the table 69 has the openings 91 in the positions that correspond to the positions of the windows 90. Also, as mentioned above, the pod lid 72 is made of a transparent substance.

Accordingly, based on the first image taken by the image pickup device 85, a position detecting unit 102 (explained later) calculates an image intensity profile of the scattered light in the two places in the substrate edge portion 10, and further detects the edge position A for the two places in the substrate edge portion 10, based on the image intensity profile of the scattered light. In addition, based on the second image taken by the image pickup device 85, the position detecting unit 102 calculates an image intensity profile of the light in the two places in the substrate edge portion 10 or the two places in the cover edge portion 89. Further, the position detecting unit 102 detects the edge positions B for the two places in the substrate edge portion 10 or the edge position for the two places in the cover edge portion 89, based on the calculated image intensity profile of the light.

The distance between the image pickup device 85 and the lower surface of the mask substrate 9 (or the lower surface of the cover 67) is adjusted so as to be the image pickup distance (WD). In addition, the camera in the image pickup device 85 is finely adjusted so that a lens unit in the camera is adjusted and focused on the lower surface of the mask substrate 9 (or the lower surface of the cover 67). The image pickup range of the image pickup device 85 includes not only the substrate edge portion 10 onto which the light is radiated from the second illuminating device 84, but also the cover edge portion 89 onto which the light is radiated from the second illuminating device 84 when the cover 67 is mounted over the mask substrate 9.

The adjustments of the distance between the image pickup device 85 and the lower surface of the mask substrate 9 and the distance between the image pickup device 85 and the lower surface of the cover 67 as well as the image pickup distance (WD), the focus depth of the lens, and the distance per camera pixel are the same as those explained in the description of the second embodiment. Even in a case where a camera having no auto-focus mechanism is used, there will be no problem as long as the focus depth is sufficient. Also, by setting, in advance, the distance per pixel for a position on the lower surface of the mask substrate 9 and for a position on the lower surface of the cover 67, it is possible to accurately calculate the positions.

The illumination controller 86 controls the first illuminating device 83 and the second illuminating device 84. More specifically, based on the control of the controlling device 88, the illumination controller 86 issues instructions to turn on and off the lights of the illuminating devices and to change or adjust, in an incremental manner, the illumination light quantity of the illuminating devices, in synchronization with the timing of the image pickup process. For example, the illumination controller 86 can be a CPU or a microcomputer. The camera controller 87 controls the image pickup device 85. More specifically, the camera controller 87 issues instructions related to an image pickup period (i.e., a shutter period) of the camera and instructions to have images taken. When the camera being used has an auto-focus mechanism, the camera controller 87 also adjusts the focus. For example, the camera controller 87 can be a CPU or a microcomputer.

The controlling device 88 controls the illumination controller 86 and the camera controller 87. The controlling device 88 detects and determines the position of the mask substrate 9 (i.e., the edge position of the substrate edge portion 10), based on the first image and/or the second image taken by the image pickup device 85. The controlling device 88 also detects the position of the cover 67 (i.e., the edge position of the cover edge portion 89) based on the second image taken by the image pickup device 85. Also, the controlling device 88 judges whether the cover 67 is mounted over the mask substrate 9 and also judges whether the mask substrate 9 and the cover 67 are positioned in predetermined positions. The controlling device 88 is configured so as to include: a controller controlling unit 101; the position detecting unit 102; a position storing unit 103; a difference calculating unit 104; a difference storing unit 105; a position determining unit 106; a determined-position storing unit 107; a cover-mount judging unit 108; and a positional-relationship judging unit 109.

The controller controlling unit 101 controls the illumination controller 86 and the camera controller 87. The position detecting unit 102 detects the edge position A of the substrate edge portion 10, based on the first image taken by the image pickup device 85, and also detects the edge position B of the substrate edge portion 10 as well as the edge position of the cover edge portion 89, based on the second image taken by the image pickup device 85. The specific method used for detecting the positions is the same as the method explained in the descriptions of the first and the second embodiments. Thus, the explanation thereof will be omitted. The position storing unit 103 is a storage medium, such as a memory, that stores therein the edge position A of the substrate edge portion 10 that has been detected based on the first image as well as the edge position B of the substrate edge portion 10 and the edge position of the cover edge portion 89 that have been detected based on the second image.

The difference calculating unit 104 calculates a difference "B−A" between the edge position A of the mask substrate 9 that has been detected based on the first image and the edge position B of the mask substrate 9 that has been detected based on the second image. The specific method used for calculating the difference is the same as the method explained in the description of the first embodiment. Thus, the explanation there of will be omitted. The difference storing unit 105 is a storage medium, such as a memory, that stores therein the difference "B–A" calculated by the difference calculating unit 104.

The position determining unit 106 determines an edge position of the substrate edge portion 10, based on the detected edge position A, the detected edge position B, the difference "B–A", and the edge position B calculated by adding the difference "B–A" to the edge position A. The determined-position storing unit 107 is a storage medium, such as a memory, that stores therein the determined edge position of the substrate edge portion 10. The cover-mount judging unit 108 judges whether the cover 67 is mounted over the mask substrate 9. The positional-relationship judging unit 109 judges whether the mask substrate 9 and the cover 67 are positioned in predetermined positions, i.e., whether the positional relationship between the mask substrate 9 and the cover 67 is correct. For example, the controlling device 88 can be a CPU or a microcomputer. The position storing unit 103, the difference storing unit 105, and the determined-position storing unit 107 can each be a cache memory in the CPU or the microcomputer. Alternatively, they can each be a RAM (not shown) or the like.

The position detecting apparatus according to any one of the first to the third embodiments is provided also in the second processing chamber 63.

Figure 23:
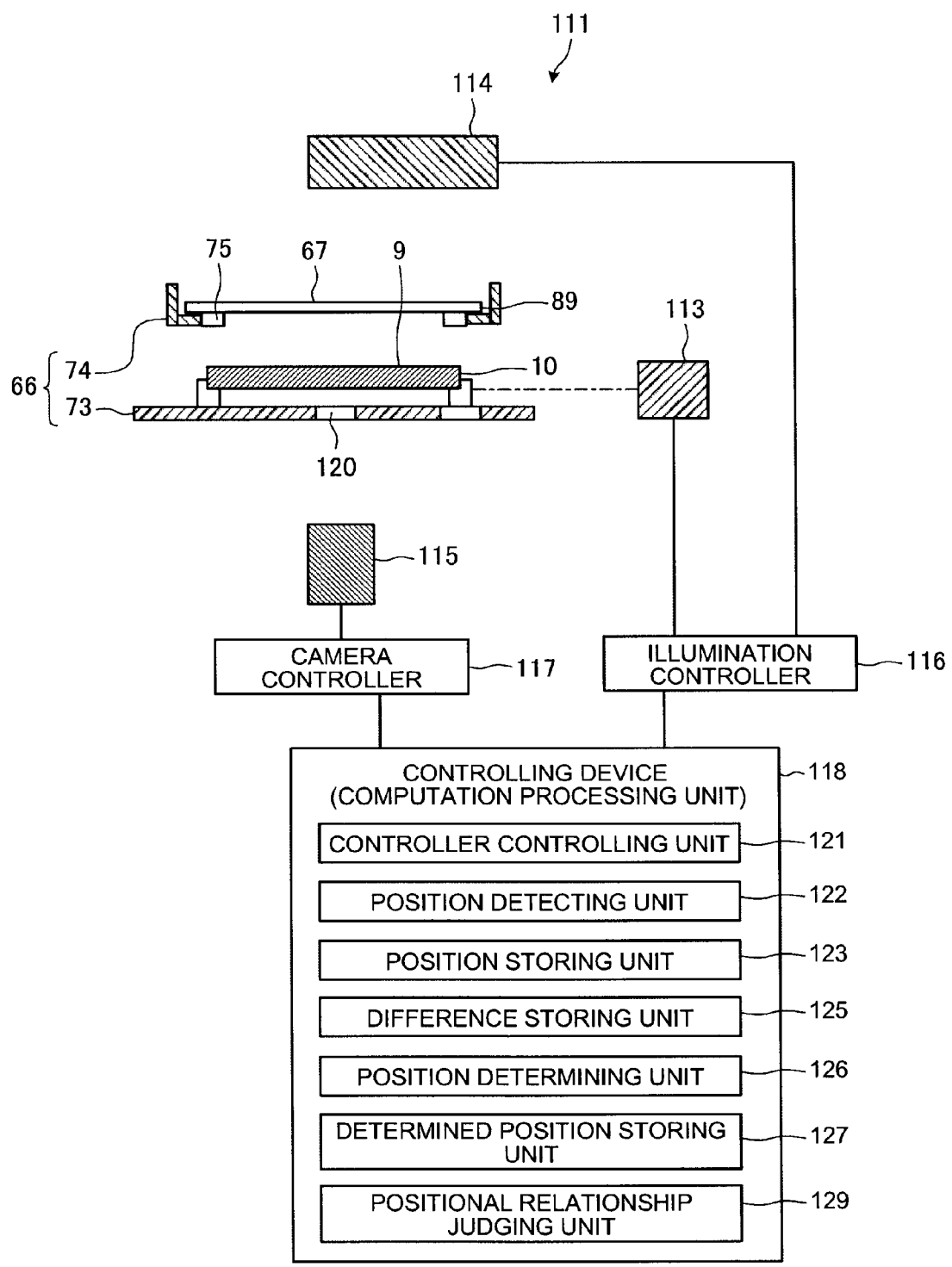
FIG. 23 is a side view of a first position detecting apparatus in a second processing chamber before a cover is mounted over a mask substrate.
Figure 24:
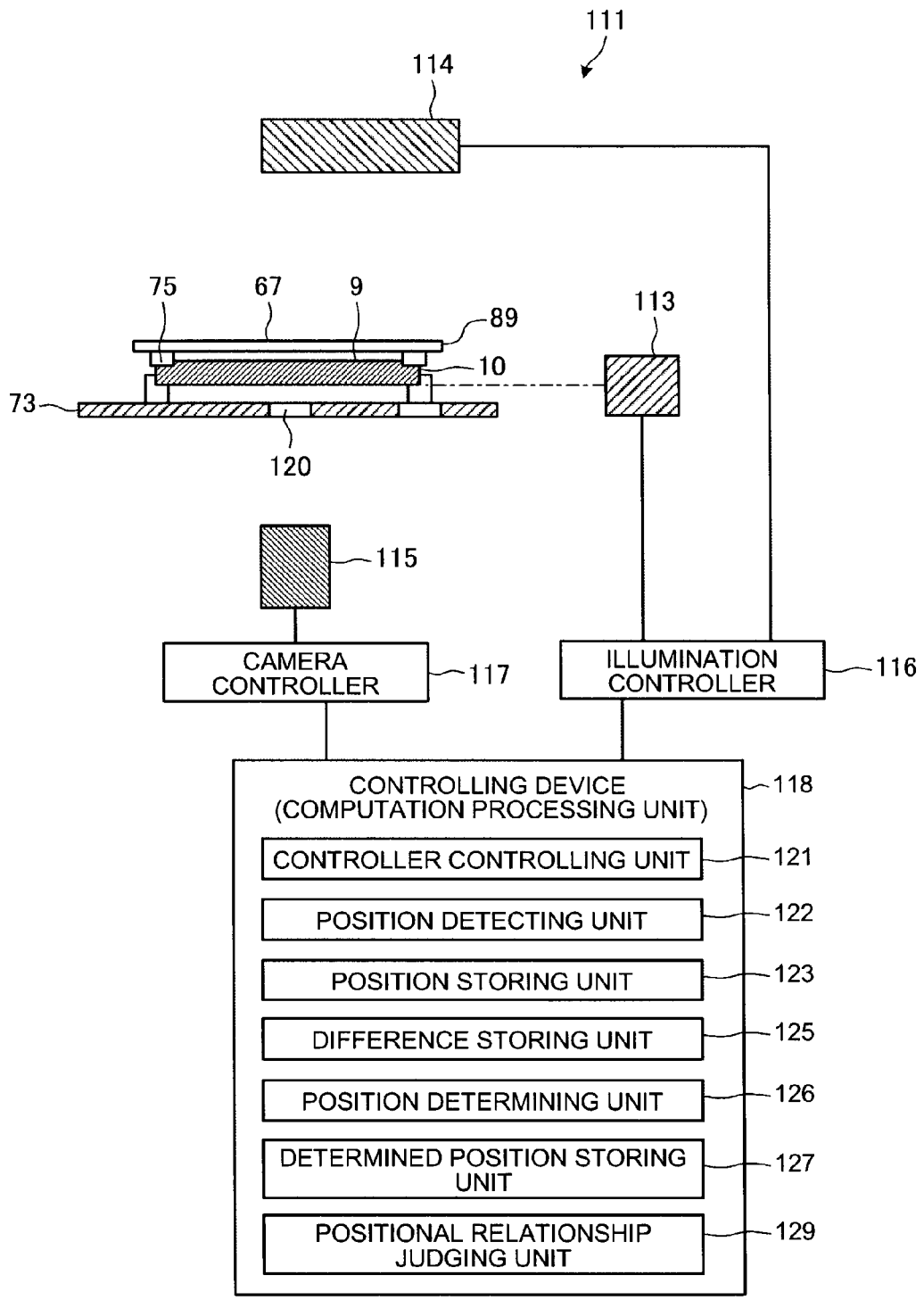
FIG. 24 is a side view of a first position detecting apparatus in a second processing chamber after a cover is mounted over a mask substrate.

As shown in FIGS. 23 and 24, a second position detecting apparatus 111 according to the fourth embodiment is configured so as to include: a first illuminating device 113; a second illuminating device 114; an image pickup device 115; an illumination controller 116; a camera controller 117; and a controlling device (computation processing unit) 118. In FIG. 24, the cover mounting hands 74 have already been retracted. As understood from FIGS. 23 and 24, the mask substrate 9 is mounted on the mask supporting stage 73.

The first illuminating device 113 radiates light in a direction substantially parallel to the front and the rear surfaces of the mask substrate 9 from a lateral face of the mask substrate 9. The illumination light has an intensity distribution spreading, in an up-and-down direction, in a range that is larger than the thickness of the mask substrate 9. Thus, the first illuminating device 113 is installed so that the lower surface of the mask substrate 9 and a radiation center of the first illuminating device 113 are positioned on substantially the same plane. Two of the first illuminating devices 113 are installed in two positions, respectively, so as to illuminate two sides of the mask substrate 9.

The second illuminating device 114 radiates light in a direction substantially perpendicular to the upper surface of the cover 67 from above the upper surface of the cover 67. Thus, the second illuminating device 114 is installed above the upper surface of the cover 67 and has an illumination range in which the cover edge portion 89 of the cover 67 is sufficiently illuminated. In the present example, LEDs are used in the first illuminating device 113 and the second illuminating device 114.

The image pickup device 115 takes a first image and a second image. The first image is an image taken while the light is being radiated from the first illuminating device 113. The second image is an image taken while the light is being radiated from the second illuminating device 114. Thus, the image pickup device 115 is installed beneath the lower surface of the mask supporting stage 73 by being fixed by a camera support (not shown). A CCD camera can be used as the image pickup device 115.

The mask supporting stage 73 has the two transparent windows 120 in two positions, respectively. One of the two positions is a position that includes two places in the substrate edge portion 10 of the mask substrate 9 in which scattered light is generated with high contrast when the first illuminating device 113 radiates the light. The other of the two positions is a position that includes two places in the cover edge portion 89 that are at the boundary between the part through which the light passes and the part shadowed by the cover 67 when the second illuminating device 114 radiates the light.

Accordingly, based on the first image taken by the image pickup device 115, a position detecting unit 122 (explained later) calculates an image intensity profile of the scattered light in the two places in the substrate edge portion 10, and further detects the edge position A for the two places in the substrate edge portion 10, based on the image intensity profile of the scattered light. In addition, based on the second image taken by the image pickup device 115, the position detecting unit 122 calculates an image intensity profile of the light in the two places in the cover edge portion 89. Further, the position detecting unit 122 detects the edge position for the two places in the cover edge portion 89, based on the calculated image intensity profile of the light.

The distance between the image pickup device 115 and the lower surface of the mask substrate 9 (the lower surface of the cover 67) is adjusted so as to be the image pickup distance (WD). In addition, the camera in the image pickup device 115 is finely adjusted so that a lens unit in the camera is adjusted and focused on the lower surface of the mask substrate 9 (the lower surface of the cover 67). The image pickup range of the image pickup device 115 includes not only the substrate edge portion 10 onto which the light is radiated from the second illuminating device 114 but also the cover edge portion 89 onto which the light is radiated from the second illuminating device 114.

The adjustments of the distance between the image pickup device 115 and the cover 67 as well as the image pickup distance (WD), the focus depth of the lens, and the distance per camera pixel are the same as those explained in the description of the first position detecting apparatus according to the fourth embodiment.

The illumination controller 116 controls the first illuminating device 113 and the second illuminating device 114. More specifically, based on the control of the controlling device 118, the illumination controller 116 issues instructions to turn on and off the lights of the illuminating devices and to change or adjust, in an incremental manner, the illumination light quantity of the illuminating devices, in synchronization with the timing of the image pickup process. For example, the illumination controller 116 can be a CPU or a microcomputer. The camera controller 117 controls the image pickup device 115. More specifically, the camera controller 117 issues instructions related to an image pickup period (i.e., a shutter period) of the camera and instructions to have images taken. When the camera being used has an auto-focus mechanism, the camera controller 117 also adjusts the focus. For example, the camera controller 117 can be a CPU or a microcomputer.

The controlling device 118 controls the illumination controller 116 and the camera controller 117. Also, the controlling device 118 detects and determines the position of the mask substrate 9 (i.e., the edge position of the substrate edge portion 10) based on the first image taken by the image pickup device 115 and the difference "B–A" that is stored in the difference storing unit 105 included in the controlling device 88. The controlling device 118 also detects the position of the cover 67 (i.e., the edge position of the cover edge portion 89) based on the second image taken by the image pickup device 115. Also, the controlling device 118 judges whether the mask substrate 9 and the cover 67 are in predetermined positions. The controlling device 118 is configured so as to include: a controller controlling unit 121; a position detecting unit 122; a position storing unit 123; a difference storing unit 125; a position determining unit 126; a determined-position storing unit 127; and a positional-relationship judging unit 129.

The controller controlling unit 121 controls the illumination controller 116 and the camera controller 117. The position detecting unit 122 detects the edge position A of the substrate edge portion 10, based on the first image taken by the image pickup device 115, and also detects the edge position of the cover edge portion 89, based on the second image taken by the image pickup device 115. The specific method used for detecting the positions is the same as the method explained in the descriptions of the first and the second embodiments. Thus, the explanation thereof will be omitted. The position storing unit 123 is a storage medium, such as a memory, that stores therein the edge position A of the substrate edge portion 10 that has been detected based on the first image and the edge position of the cover edge portion 89 that has been detected based on the second image.

The difference storing unit 125 is a storage medium, such as a memory, that stores therein the difference "B−A" that is stored in the difference storing unit 105 included in the controlling device 88. An arrangement is acceptable in which the difference is transmitted from the difference storing unit 105 to the difference storing unit 125 by connecting the controlling device 88 and the controlling device 118 to each other via a network. Alternatively, another arrangement for storing the difference is acceptable in which a user transfers data stored in the difference storing unit 105 into a portable storage device and further transfers the data into the difference storing unit 125. Further, it is acceptable to perform the position detection process by configuring the functions of the controlling device 118 and the functions of the controlling device 88 into an apparatus, so that the functions of the difference storing unit 105 and the functions of the difference storing unit 125 are integrated together.

The position determining unit 126 determines the edge position of the substrate edge portion 10, based on the edge position B that is calculated by adding the difference "B−A" to the detected edge position A. The determined-position storing unit 127 is a storage medium, such as a memory, that stores therein the determined edge position of the substrate edge portion 10. The positional-relationship judging unit 129 judges whether the mask substrate 9 and the cover 67 are positioned in predetermined positions, i.e., whether the positional relationship between the mask substrate 9 and the cover 67 is correct. For example, the controlling device 118 can be a CPU or a microcomputer. The position storing unit 123, the difference storing unit 125, and the determined-position storing unit 127 can each be a cache memory in the CPU or the microcomputer. Alternatively, they can each be a RAM (not shown) or the like.

Figure 25A:
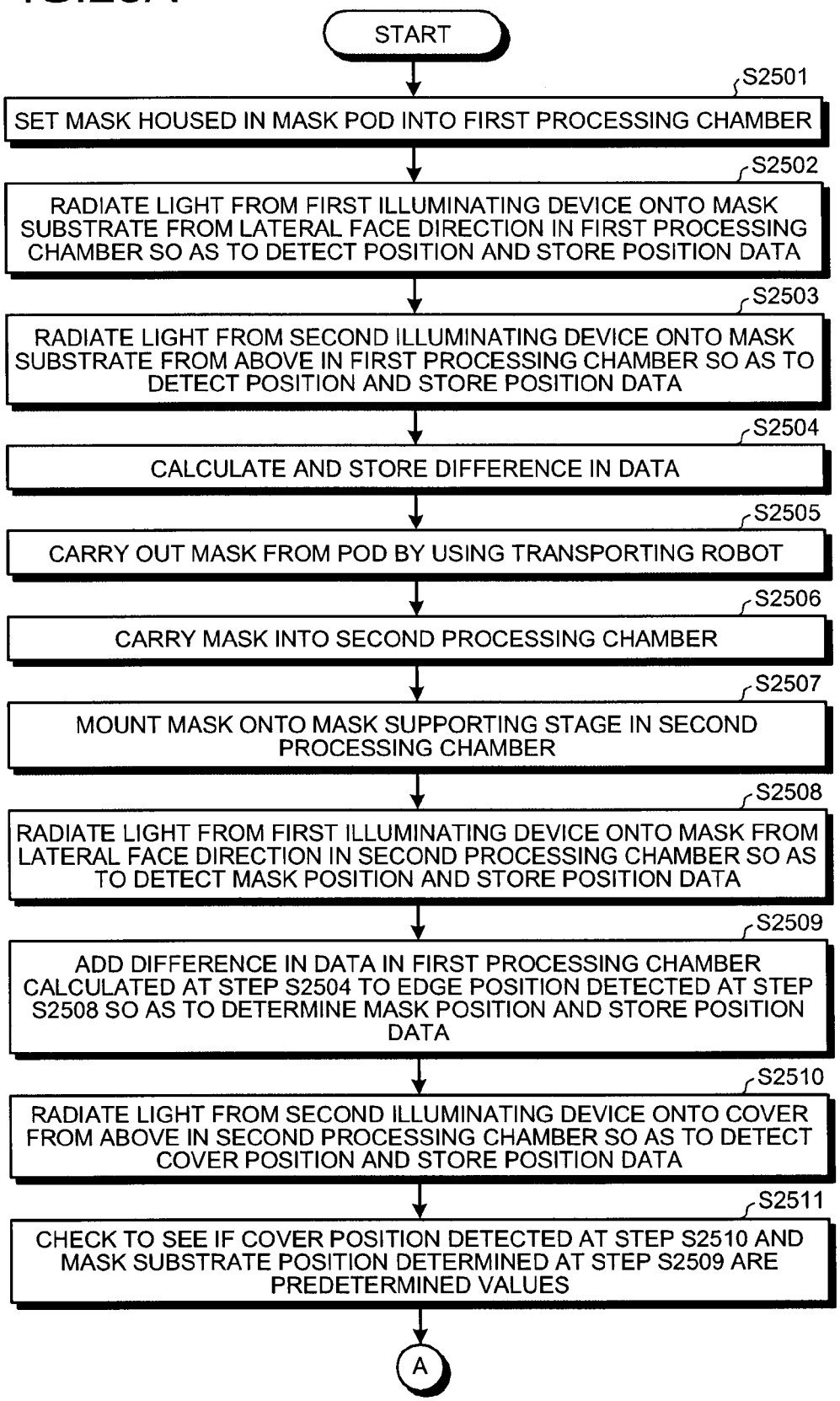
FIGS. 25A and 25B are flowcharts of a procedure in a cover mounting process performed by a cover mounting device.
Figure 25B:
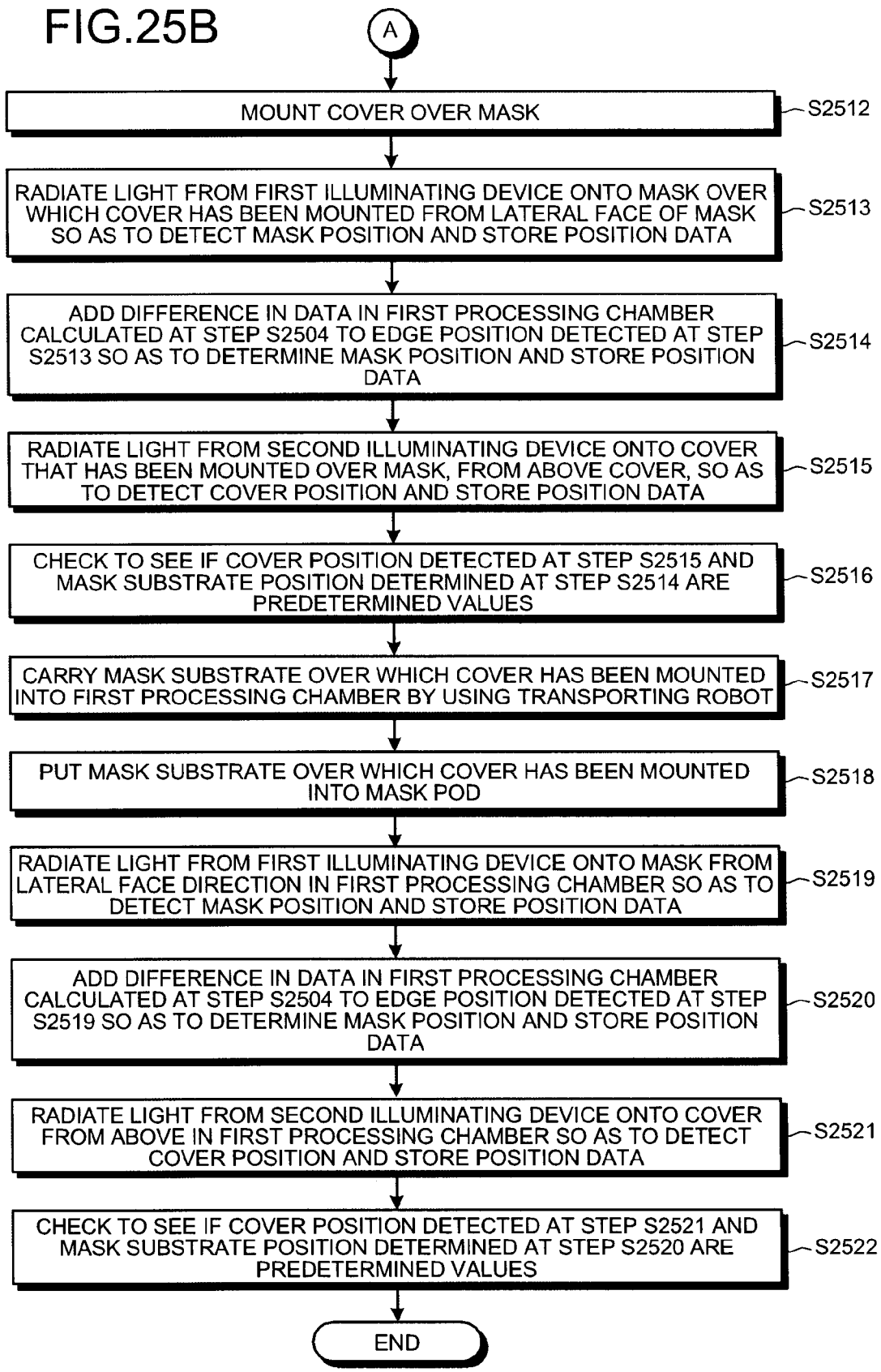

Next, the method used by the cover mounting device configured as described above to take out the mask substrate from the mask pod, attach a cover to the mask substrate, and put the mask substrate into the mask pod again will be explained, with reference to FIGS. 25A and 25B. The procedures at steps S2501 through S2505 and at steps S2517 through S2522 are performed primarily in the first processing chamber 62. The procedure at steps S2506 through S2516 is primarily performed in the second processing chamber 63.

First, the mask substrate 9 that has been housed in the mask pod 68 is set into the first processing chamber 62 (step S2501). Shown in FIGS. 20 and 21 is the first processing chamber 62 in this state.

When the cover-mount judging unit 108 has judged that the cover 67 is not mounted over the mask substrate 9, the illumination controller 86 turns on the light of the first illuminating device 83, so that the first illuminating device 83 radiates light onto the mask substrate 9 from the direction of a lateral face of the substrate edge portion 10 of the mask substrate 9. While the light is being radiated from the first illuminating device 83, the image pickup device 85 takes an image, so that the position detecting unit 102 detects the edge position A of the substrate edge portion 10, based on the first image taken by the image pickup device 85. The position storing unit 103 stores therein the detected edge position (step S2502). After that the illumination controller 86 turns off the light of the first illuminating device 83.

Further, the illumination controller 86 turns on the light of the second illuminating device 84. The illuminating device 84 radiates light in a direction substantially perpendicular to the upper surface of the mask substrate 9 from above the mask substrate 9. While the light is being irradiated from the second illuminating device 84, the image pickup device 85 takes an image. The position detecting unit 102 detects the edge position B of the substrate edge portion 10 based on the second image taken by the image pickup device 85. The position storing unit 103 stores therein the detected edge position (step S2503). Subsequently, the illumination controller 86 turns off the light of the second illuminating device 84.

The difference calculating unit 104 calculates a difference "B−A" in the position data between the detected position of the substrate edge portion 10 that has been detected based on the first image and the detected position of the substrate edge portion 10 that has been detected based on the second image, the detected positions having been stored in the position storing unit 103. The difference storing unit 105 stores therein the calculated difference in the position data (step S2504).

The mask-pod open-close mechanism 64 opens the mask pod 68. Then, the transporting robot 65 takes the mask substrate 9 out of the pod bottom 71 of the mask pod 68 and carries out the mask substrate 9 from the first processing chamber 62 (step S2505).

Further, the transporting robot 65 carries the mask substrate 9 into the second processing chamber 63 (step S2506).

In the second processing chamber 63, the transporting robot 65 mounts the mask substrate 9 onto the mask supporting stage 73 of the cover mounting mechanism 66 (step S2507). After that, as shown in FIG. 23, the cover mounting hands 74 moves to a position above the mask substrate 9 while holding the cover 67. Subsequently, for the purpose of mounting the cover 67 over the mask substrate 9 with an accurate positional relationship (i.e., so that the mound portions of the pads 75 of the cover 67 do not touch the mask substrate 9), the current position of the cover 67 and the current position of the mask substrate 9 placed on the mask supporting stage 73 are measured.

First, let us discuss the process for measuring the position of the mask substrate 9 placed on the mask supporting stage 73. Even if the cover 67 is positioned above the mask substrate 9, it is possible to detect the edge position of the substrate edge portion 10 of the mask substrate 9 by using the first illuminating device 113. Thus, the illumination controller 116 turns on the light of the first illuminating device 113, so that the first illuminating device 113 radiates light onto the mask substrate 9 from the direction of a lateral face of the substrate edge portion 10 of the mask substrate 9. While the light is being radiated from the first illuminating device 113, the image pickup device 115 takes an image. The position detecting unit 122 detects the edge position A of the substrate edge portion 10, based on the first image taken by the image pickup device 115. The position storing unit 123 stores therein the detected edge position (step S2508). After that, the illumination controller 116 turns off the light of the first illuminating device 113.

However, as understood from FIG. 23, while the cover 67 is positioned above the mask substrate 9, it is not possible to detect the edge position B of the substrate edge portion 10 of the mask substrate 9 by using the second illuminating device 114 because the cover 67 is in the way. Thus, the position determining unit 126 calculates the edge position B of the substrate edge portion 10 by adding the difference "B−A" in the position data that has been calculated by the difference calculating unit 104 included in the first position detecting apparatus 81 and has been stored in the difference storing unit 125 included in the second position detecting apparatus 111 at step S2504 to the edge position A of the substrate edge portion 10 that has been detected at step S2508. The position determining unit 126 determines the edge position B as the edge position of the substrate edge portion 10. The determined-position storing unit 127 stores therein the determined edge position (step S2509).

As explained above, even in a situation where it is not possible to detect the edge position B of the substrate edge portion 10 of the mask substrate 9 by using the second illuminating device 114 because the cover 67 is positioned above the mask substrate 9, it is possible to determine the edge position of the substrate edge portion 10 and to find out the position of the mask substrate because of the process performed by the position determining unit 126 to add the difference "B−A" in the position data that has been calculated in advance to the detected edge position A of the substrate edge portion 10.

In a case where the calculated difference "B−A" is smaller than the level of precision required in the measuring process so that there is a high possibility that the edge formation process applied to the substrate edge portion is a chamfered edge formation process, and there is no need to concern about degradation of the level of precision in the measuring process, it is acceptable for the position determining unit 126 to determine, without performing the process at step S2509, the edge position A that has been detected by using the first illuminating device 113 as the edge position of the substrate edge portion 10.

Next, let us discuss the process for measuring the position of the cover 67. The illumination controller 116 turns on the light of the second illuminating device 114, so that the second illuminating device 114 radiates light in a direction substantially perpendicular to the upper surface of the cover 67 from above the cover 67. While the light is being radiated from the second illuminating device 114, the image pickup device 115 takes an image. The position detecting unit 122 detects the edge position of the cover edge portion 89, based on the second image taken by the image pickup device 115. The position storing unit 123 stores therein the detected edge position (step S2510). After that, the illumination controller 116 turns off the light of the second illuminating device 114.

Subsequently, the positional-relationship judging unit 129 checks to see if the cover 67 and the mask substrate 9 are in predetermined positions, based on the edge position of the cover edge portion 89 of the cover 67 that has been calculated at step S2510 and the edge position of the substrate edge portion 10 of the mask substrate 9 that has been determined at step S2509 (step S2511). The level of precision for the detected position of the cover edge portion 89 is lower than the level of precision for the determined position of the substrate edge portion 10 of the mask substrate 9. However, if the cover 67 and the mask substrate 9 are in an accurate positional relationship with each other, because there is an allowance of a certain distance between the lateral faces of the mound portion of each of the pads 84 of the cover 67 and the lateral faces of the mask substrate 9, there will be no substantial problem.

The cover mounting mechanism 66 then mounts the cover 67 over the mask substrate 9 (step S2512). In a case where the positional-relationship judging unit 129 has judged that the cover 67 and the mask substrate 9 are not in the predetermined positions, the procedure is discontinued, because if the cover 67 was to be mounted on the mask substrate 9, the mask substrate 9 would come into contact with the mound portions of the pads 75 of the cover 67, and particles might occur or, in the worst case, the mask substrate might be damaged.

In consideration of a possibility that the cover 67 and the mask substrate 9 are not in their proper positions because of the vibrations caused during the process of mounting the cover 67 over the mask substrate 9, the position of the cover 67 and the position of the mask substrate 9 are measured again after the cover 67 has been mounted over the mask substrate 9.

First, let us discuss the process for measuring the position of the mask substrate 9. Even if the cover 67 is mounted above the mask substrate 9, it is possible to detect the edge position of the substrate edge portion 10 of the mask substrate 9 by using the first illuminating device 113. Thus, the illumination controller 116 turns on the light of the first illuminating device 113, so that the first illuminating device 113 radiates light onto the mask substrate 9 from the direction of a lateral face of the substrate edge portion 10 of the mask substrate 9. While the light is being radiated from the first illuminating device 113, the image pickup device 115 takes an image. The position detecting unit 122 detects the edge position A of the substrate edge portion 10, based on the first image taken by the image pickup device 115. The position storing unit 123 stores therein the detected edge position (step S2513). After that, the illumination controller 116 turns off the light of the first illuminating device 113.

However, as understood from FIG. 23, while the cover 67 is mounted above the mask substrate 9, it is not possible to detect the edge position B of the substrate edge portion 10 of the mask substrate 9 by using the second illuminating device 114 because the cover 67 is in the way. Thus, the position determining unit 126 calculates the edge position B of the substrate edge portion 10 by adding the difference "B−A" in the position data that has been calculated by the difference calculating unit 104 included in the first position detecting apparatus 81 and has been stored in the difference storing unit 125 included in the second position detecting apparatus 111 at step S2504 to the edge position A of the substrate edge portion 10 that has been detected at step S2513. The position determining unit 126 determines the edge position B as the edge position of the substrate edge portion 10. The determined-position storing unit 127 stores therein the determined edge position (step S2514).

As explained above, even in a situation where it is not possible to detect the edge position B of the substrate edge portion 10 of the mask substrate 9 by using the second illuminating device 114 because the cover 67 is mounted over the mask substrate 9, it is possible to determine the edge position of the substrate edge portion 10 and to find out the position of the mask substrate because of the process performed by the position determining unit 126 to add the difference "B−A" in the position data that has been calculated in advance to the detected edge position A of the substrate edge portion 10.

In a case where the calculated difference "B−A" is smaller than the level of precision required in the measuring process so that there is a high possibility that the edge formation process applied to the substrate edge portion is a chamfered edge formation process, and there is no need to concern about degradation of the level of precision in the measuring process, it is acceptable for the position determining unit 126 to determine, without performing the process at step S2514, the edge position A that has been detected by using the first illuminating device 113 as the edge position of the substrate edge portion 10.

Next, let us discuss the process for measuring the position of the cover 67. The illumination controller 116 turns on the light of the second illuminating device 114, so that the second illuminating device 114 radiates light in a direction substantially perpendicular to the upper surface of the cover 67 from above the cover 67. While the light is being radiated from the second illuminating device 114, the image pickup device 115 takes an image. The position detecting unit 122 detects the edge position of the cover edge portion 89, based on the second image taken by the image pickup device 115. The position storing unit 123 stores therein the detected edge position (step S2515). After that, the illumination controller 116 turns off the light of the second illuminating device 114.

Subsequently, the positional-relationship judging unit 129 checks to see if the cover 67 is mounted over the mask substrate 9 while the cover 67 and the mask substrate 9 are in predetermined positions, based on the edge position of the cover edge portion 89 of the cover 67 that has been calculated at step S2515 and the edge position of the substrate edge portion 10 of the mask substrate 9 that has been determined at step S2514 (step S2516). The level of precision for the detected position of the cover edge portion 89 is lower than the level of precision for the determined position of the substrate edge portion 10 of the mask substrate 9. However, if the cover 67 and the mask substrate 9 are in an accurate positional relationship with each other, because there is an allowance of a certain distance between the lateral faces of the mound portion of each of the pads 84 of the cover 67 and the lateral faces of the mask substrate 9, there will be no substantial problem.

In a case where the positional-relationship judging unit 129 has judged that the cover 67 and the mask substrate 9 are not in the predetermined positions, the procedure is discontinued, because if the procedure was to be continued, the lateral faces of the mask substrate 9 would come into contact with the mound portions of the pads 75 of the cover 67, and particles might occur or, in the worst case, the mask substrate might be damaged.

The transporting robot 65 carries out the mask substrate 9 over which the cover 67 is mounted from the second processing chamber 63 and carries the mask substrate 9 with the cover 67 into the first processing chamber (step S2517).

In the first processing chamber 62, the transporting robot 65 places the mask substrate 9 onto the pod bottom 71 of the mask pod 68. The mask-pod open-close mechanism 64 closes the mask pod 68 (step S2518). Shown in FIG. 22 is the first processing chamber 62 in this state.

In consideration of a possibility that the cover 67 and the mask substrate 9 has come out of their proper positions during the process of carrying out the mask substrate 9 over which the cover 67 is mounted from the second processing chamber 63 and carrying them into the first processing chamber 62 so as to place them on the pod bottom 71 of the mask pod 68, the position of the cover 67 and the position of the mask substrate 9 are measured again.

First, let us discuss the process for measuring the position of the mask substrate 9. This measuring process is performed after the cover-mount judging unit 108 has judged that the cover 67 is mounted over the mask substrate 9. Even if the cover 67 has been mounted over the mask substrate 9, it is possible to detect the edge position of the substrate edge portion 10 of the mask substrate 9 by using the first illuminating device 83. Thus, the illumination controller 86 turns on the light of the first illuminating device 83, so that the first illuminating device 83 radiates light onto the mask substrate 9 from the direction of a lateral face of the substrate edge portion 10 of the mask substrate 9. While the light is being radiated from the first illuminating device 83, the image pickup device 85 takes an image. The position detecting unit 102 detects the edge position A of the substrate edge portion 10, based on the first image taken by the image pickup device 85. The position storing unit 103 stores therein the detected edge position (step S2519). After that, the illumination controller 86 turns off the light of the first illuminating device 83.

However, as understood from FIG. 22, while the cover 67 is mounted over the mask substrate 9, it is not possible to detect the edge position B of the substrate edge portion 10 of the mask substrate 9 by using the second illuminating device 84 because the cover 67 is in the way. Thus, the position determining unit 106 calculates the edge position B of the substrate edge portion 10 by adding the difference "B–A" in the position data that has been calculated by the position detecting unit 102 and has been stored in the difference storing unit 105 at step S2504 to the edge position A of the substrate edge portion 10 that has been detected at step S2519. The position determining unit 106 determines the edge position B as the edge position of the substrate edge portion 10. The determined-position storing unit 107 stores therein the determined edge position (step S2520).

As explained above, even in a situation where it is not possible to detect the edge position B of the substrate edge portion 10 of the mask substrate 9 by using the second illuminating device 84 because the cover 67 is mounted over the mask substrate 9, it is possible to determine the edge position of the substrate edge portion 10 and to find out the position of the mask substrate because of the process performed by the position determining unit 106 to add the difference "B–A" in the position data that has been calculated in advance to the detected edge position A of the substrate edge portion 10.

In a case where the calculated difference "B–A" is smaller than the level of precision required in the measuring process so that there is a high possibility that the edge formation process applied to the substrate edge portion is a chamfered edge formation process, and there is no need to concern about degradation of the level of precision in the measuring process, it is acceptable for the position determining unit 106 to determine, without performing the process at step S2519, the edge position A that has been detected by using the first illuminating device 83 as the edge position of the substrate edge portion 10.

Next, let us discuss the process for measuring the position of the cover 67. The illumination controller 86 turns on the light of the second illuminating device 84, so that the second illuminating device 84 radiates light in a direction substantially perpendicular to the upper surface of the cover 67 from above the cover 67. While the light is being radiated from the second illuminating device 84, the image pickup device 85 takes an image. The position detecting unit 102 detects the edge position of the cover edge portion 89, based on the second image taken by the image pickup device 85. The position storing unit 103 stores therein the detected edge position (step S2521). After that, the illumination controller 86 turns off the light of the second illuminating device 84.

Subsequently, the positional-relationship judging unit 109 checks to see if the cover 67 is mounted over the mask substrate 9 while the cover 67 and the mask substrate 9 are in the predetermined positions, based on the edge position of the cover edge portion 89 of the cover 67 that has been calculated at step S2521 and the edge position of the substrate edge portion 10 of the mask substrate 9 that has been determined at step S2520 (step S2522). Thus, the process has been completed. The level of precision for the detected position of the cover edge portion 89 is lower than the level of precision for the determined position of the substrate edge portion 10 of the mask substrate 9. However, if the cover 67 and the mask substrate 9 are in an accurate positional relationship with each other, because there is an allowance of a certain distance between the lateral faces of the mound portion of each of the pads 84 of the cover 67 and the lateral faces of the mask substrate 9, there will be no substantial problem.

In a case where the positional-relationship judging unit 109 has judged that the cover 67 and the mask substrate 9 are not in the predetermined positions, the procedure is discontinued, because if the procedure was to be continued, the lateral faces of the mask substrate 9 would come into contact with the mound portions of the pads 75 of the cover 67, and particles might occur or, in the worst case, the mask substrate might be damaged.

In the fourth embodiment, the configuration of the controlling device 88 included in the first position detecting apparatus 81 is slightly different from the configuration of the controlling device 118 included in the second position detecting apparatus 111. However, another arrangement is acceptable where the controlling device 88 and the controlling device 118 have the same configuration as each other. In that situation, the functions to be used in the controlling devices may be selected, as necessary, depending on in which one of the processing chambers (i.e., the first processing chamber 62 or the second processing chamber 63), the controlling device is used. With this arrangement, it is possible to save the trouble of manufacturing the two types of controlling devices.

In addition, to realize a high level of precision, it is desirable to have an arrangement in which the configuration of the first position detecting apparatus 81 is basically the same as the configuration of the second position detecting apparatus 111 so that the image pickup devices and the illuminating devices are in substantially the same positional arrangement. In particular, by using a positional-arrangement relationship in common with regard to the first illuminating device for radiating light from a lateral face direction, the substrate, and the image pickup device, it is possible to minimize an error in the position detection process of the substrate in the first processing chamber 62 and the second processing chamber 63.

As explained above, when the cover mounting device according to the fourth embodiment is used, by using the position detecting apparatus and the method used by the position detecting apparatus that have been explained in the first embodiment, even in a situation where it is not possible to detect the edge position of the substrate edge portion of the mask substrate by using the second illuminating device, it is possible to determine the edge position of the substrate edge portion and to find out the position of the mask substrate by adding the difference in the position data that has been calculated in advance to the edge position of the substrate edge portion of the mask substrate that has been detected by using the first illuminating device. Consequently, it is possible to provide a cover mounting device that has a high level of precision in the process to detect the position of the mask substrate.

Further, when the cover mounting device according to the fourth embodiment is used, by using the position detecting apparatus and the method used by the position detecting apparatus that have been explained in the first embodiment and the second embodiment, it is possible to mount the cover over the mask substrate after checking the positional relationship between the position of the mask substrate and the position of the cover before the cover is mounted over the mask substrate. Thus, it is possible to provide a cover mounting device that does not make cover-mounting errors and has high reliability.

Furthermore, when the cover mounting device according to the fourth embodiment is used, by using the position detecting apparatus and the method used by the position detecting apparatus that have been explained in the first embodiment and the second embodiment, it is possible to detect the position of the mask substrate and the position of the cover even after the cover has been mounted over the mask substrate so as to check the positional relationship between them. Thus, it is possible to detect if the cover is not in the predetermined position after the mounting process. Consequently, it is possible to provide a cover mounting device that has high reliability.

In a fifth embodiment, in an EUV exposure apparatus, when a mask substrate covered with a removable pellicle is mounted onto a mask stage after being detached from the removable pellicle, the position detecting apparatus according to any one of the first to the third embodiments is applied in the process of mounting the mask substrate onto the mask stage.

The fifth embodiment will be explained with reference to the accompanying drawings. First, a flow in an EUV exposure apparatus will be explained in which an EUV mask that is covered with a removable pellicle is held by a mask chuck and then goes onto the following exposure step.

Figure 26A:
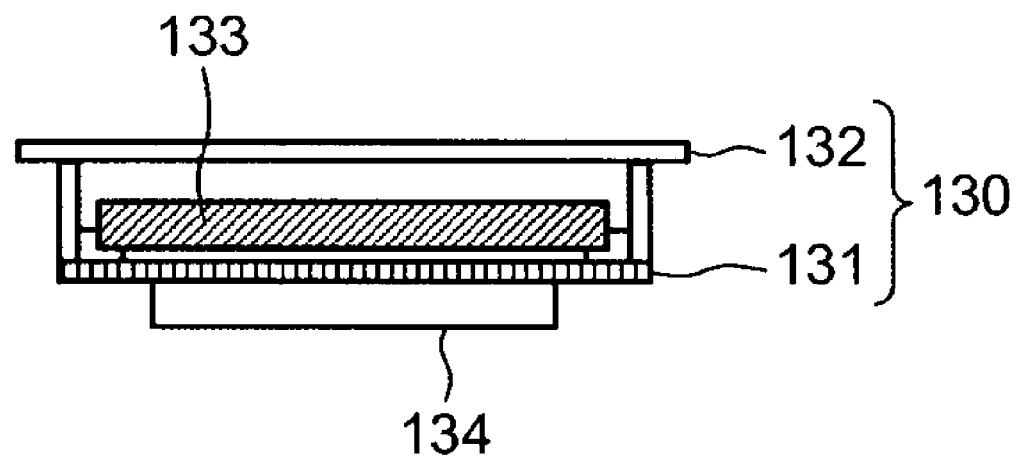
FIGS. 26A and 26B are schematic drawings for explaining a relationship between a removable pellicle and a transporting robot hand.

Shown in FIG. 26A is a state in which an EUV mask 133 is mounted on a transporting robot hand 134 while being covered with a removable pellicle 130. The removable pellicle 130 is made up of a removable pellicle base 131 and a removable pellicle cover 132. The EUV mask 133 is stored while being mounted on the removable pellicle base 131 and further being covered with the removable pellicle cover 132. In this situation, the pattern-forming surface of the EUV mask 133 is positioned on the removable pellicle base 131 side. The transporting robot hand 134 is supporting the removable pellicle 130 in which the EUV mask 133 is stored, at the lower surface of the removable pellicle base 131.

Figure 26B:
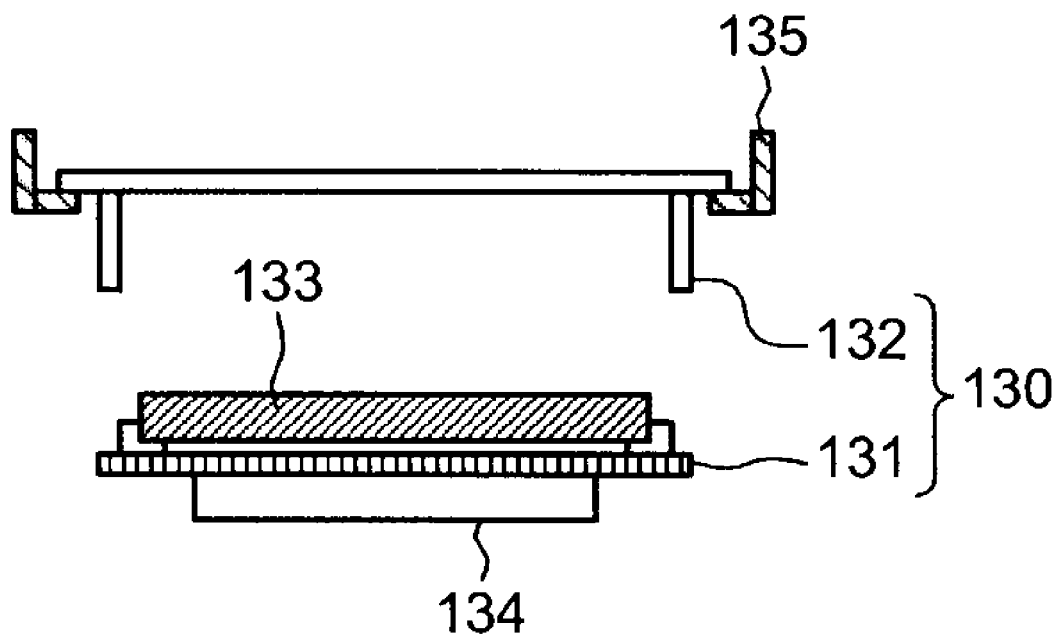

Shown in FIG. 26B is a state in which the removable pellicle cover 132 is separated from the removable pellicle base 131. When the EUV mask 133 is used in an exposure process, a removable pellicle cover opener 135 lifts up the removable pellicle cover 132, so that a surface of the EUV mask 133 opposite to the pattern-forming surface is open to the surrounding. Subsequently, the transporting robot hand 134 transports the EUV mask 133 that has been mounted on the removable pellicle base 131 to a position detecting apparatus 141.

As shown in FIG. 27, the transporting robot hand 134 transports the removable pellicle base 131 on which the EUV mask 133 is mounted to a position where the position detecting apparatus 141 is located. The position detecting apparatus 141 detects the position of the EUV mask 133. In this situation, the position detecting apparatus 141 is used while the removable pellicle cover 132 is separated from the EUV mask 133. Thus, it is possible to detect the position of the EUV mask 133.

After the position of the EUV mask 133 has been detected, the transporting robot hand 134 transports the removable pellicle base 131 on which the EUV mask 133 is mounted to a position beneath a mask chuck 142. The mask chuck 142 is connected to a mask stage (not shown). When the mask stage is driven so that the mask chuck 142 is in contact with the surface of the EUV mask 133 opposite to the pattern-forming surface, the EUV mask 133 is held by the mask chuck 142 (i.e., fixed by the mask chuck 142) due to a static force between the contact surfaces of the mask chuck 142 and the EUV mask 133. It is assumed that a static chuck is usually used in EUV exposure apparatuses. In this situation, the mask stage is able to cause the EUV mask 133 to be in contact with, and to be held at, a predetermined position of the mask chuck 142, by making use of the position of the EUV mask 133 detected by the position detecting apparatus 141.

After the EUV mask 133 is held by the mask chuck 142, the mask chuck 142 is raised, or the transporting robot hand 134 is lowered, so that the removable pellicle base 131 is separated from the EUV mask 133. As a result, the pattern-forming surface of the EUV mask 133 is exposed to an exposure optical system of the exposure apparatus. Thus, the process proceeds to the next exposure step.

Next, the position detecting apparatus 141 according to the fifth embodiment will be explained in detail. The position detecting apparatus 141 is configured so as to include: an illuminating device 143; a mirror 144; an image pickup device 145; an illumination controller 146; a camera controller 147; and a controlling device (computation processing unit) 148.

The illuminating device 143 radiates light in a direction substantially parallel to the front and the rear surfaces of the EUV mask 133 from a lateral face of the EUV mask 133. The illumination light has an intensity distribution spreading, in an up-and-down direction, in a range that is larger than the thickness of the EUV mask 133. Thus, the illuminating device 143 is installed so that the surface of the EUV mask 133 opposite to the pattern-forming surface and a radiation center of the illuminating device 143 are positioned on substantially the same plane. In the present example, LEDs are used in the illuminating device 143.

The mirror 144 is provided above the lateral face of the EUV mask 133 on which the light is radiated from the illuminating device 143. The mirror 144 is fixed while a reflection surface thereof is positioned at an angle of approximately 45 degrees with respect to the surface of the EUV mask 133. Thus, when the illuminating device 143 radiates the light onto the lateral face of the EUV mask 133, a bundle of rays of scattered light generated in an edge portion 150 of the EUV mask 133 becomes incident to the mirror 144. The mirror 144 then refracts the bundle of rays 149 by approximately 90 degrees so that the light is emitted to the right.

The image pickup device 145 is installed in a destination position of the bundle of rays 149 emitted by the mirror 144 and takes an image formed by the bundle of rays 149. Further, the image pickup device 145 has an auto-focus mechanism. A CCD camera can be used as the image pickup device 145. The illuminating device 143, the mirror 144, an the image pickup device 145 are arranged so as to have such a positional relationship because of a constraint related to the positional arrangement for a stage driving system, an exposure illumination optical system, and a fine alignment optical system that are provided in the exposure apparatus.

The distance to reach the image pickup device 145 from the surface of the EUV mask 133 opposite to the pattern-forming surface via the mirror 144 is adjusted so as to be the image pickup distance (WD). Further, in the camera included in the image pickup device 145, a lens unit in the camera is adjusted and focused on the pattern-forming surface of the EUV mask 133 via the mirror 144, by the auto-focus mechanism. The image pickup range of the image pickup device 115 is an area that includes the mirror 144 reflecting the image of the edge portion 150 on which the light from the illuminating device 143 is radiated.

The illumination controller 146 controls the illuminating device 143. More specifically, based on the control of the controlling device 148, the illumination controller 146 issues instructions to turn on and off the light of the illuminating device and to change or adjust, in an incremental manner, the illumination light quantity of the illuminating device, in synchronization with the timing of the image pickup process. For example, the illumination controller 146 can be a CPU or a microcomputer. The camera controller 147 controls the image pickup device 145. More specifically, the camera controller 147 issues instructions related to an image pickup period (i.e., a shutter period) of the camera and instructions to have images taken. The camera controller 147 also adjusts the focus of the auto-focus mechanism. For example, the camera controller 147 can be a CPU or a microcomputer.

The controlling device 148 controls the illumination controller 146 and the camera controller 147 and detects and determines the position of the EUV mask 133 (i.e., the edge position of the edge portion 150), based on the image taken by the image pickup device 145 and a difference "B−A" that has been calculated, in advance, in another apparatus such as the cover mounting device explained in the description of the fourth embodiment or in a mask load port of an exposure apparatus. The controlling device 148 is configured so as to include: a controller controlling unit 151; a position detecting unit 152; a position storing unit 153; a difference storing unit 155; a position determining unit 156; and a determined-position storing unit 157.

The controller controlling unit 151 controls the illumination controller 146 and the camera controller 147. The position detecting unit 152 detects the edge position A of the edge portion 150 of the EUV mask 133, based on the image taken by the image pickup device 145. The specific method used for detecting the position is the same as the method explained in the first embodiment. Thus, the explanation of the method will be omitted. The position storing unit 153 is a storage medium, such as a memory, that stores therein the edge position A of the edge portion 150 that has been detected based on the first image.

The difference storing unit 155 is a storage medium, such as a memory, that stores therein the difference "B−A" that has been calculated, in advance, in another apparatus such as the cover mounting device explained in the description of the fourth embodiment or in the mask load port of the exposure apparatus. An arrangement is acceptable in which the difference is transmitted to the difference storing unit 155 by having these apparatuses connected to each other via a network. Alternatively, another arrangement for storing the difference is acceptable in which a user inputs the difference data into the difference storing unit 155.

The position determining unit 156 determines the edge position of the edge portion 150, based on the edge position B that is calculated by adding the difference "B−A" to the detected edge position A. The determined-position storing unit 157 is a storage medium, such as a memory, that stores therein the determined edge position of the edge portion 150. For example, the controlling device 148 can be a CPU or a microcomputer. The position storing unit 153, the difference storing unit 155, and the determined-position storing unit 157 can each be a cache memory in the CPU or the microcomputer. Alternatively, they can each be a RAM (not shown) or the like.

As explained above, the position detecting apparatus 141 detects the edge position A based on the image obtained by radiating the light on the lateral face of the EUV mask 133. The position detecting apparatus 141 is able to accurately find out the position of the EUV mask 133 (i.e., the edge position of the edge portion 150) by adding the difference "B−A" that has been calculated in another apparatus such as the cover mounting device explained in the description of the fourth embodiment or in the mask load port of the exposure apparatus, to the detected edge position A.

The amount of the edge portion 150 of the EUV mask 133 is as small as, at most, one sixth of that of a regular photomask, according to a SEMI standard. Thus, in some situations, it is acceptable to determine the edge position A of the edge portion 150 that has been detected based on the image obtained by radiating the light on the lateral face of the EUV mask as the edge position of the edge portion 150, without taking the difference into consideration.

Because an LED illumination is used in the illuminating device 143, the illuminating device 143 emits light with a spreading angle of approximately tens of degrees. Thus, the emitted light is also radiated on the edge position of the removable pellicle base 131. Consequently, it is possible to detect the position of the removable pellicle base 131 by using the position detecting apparatus 141. Further, it is possible to find out a positional relationship between the EUV mask 133 and the removable pellicle base 131 by adding the function of the positional-relationship judging unit 109 explained in the fourth embodiment to the position detecting apparatus 141.

According to the fifth embodiment, it is possible to check the position of the EUV mask 133 before the EUV mask 133 is mounted on the mask chuck 142. In correspondence with the measured position of the EUV mask 133, it is possible for the mask chuck 142 to hold the EUV mask 133 after the mask stage drives the mask chuck 142 so as to be within a predetermined positional range required in holding the EUV mask 133.

In this situation, the required predetermined positional range denotes a range in which a search is conducted for an alignment mark of the EUV mask 133. This range corresponds to a so-called capture range of a detecting device that is provided in an exposure apparatus and detects an alignment mark. When the mask chuck 142 holds the EUV mask 133, if the position exceeds the capture range, it is not possible to align the EUV mask 133. Thus, a mask load error occurs, and it is not possible to perform the exposure process. This will lead to a large degradation of the throughput of the exposure apparatus. By using the position detecting apparatus according to the fifth embodiment, it is also possible to avoid having the problems of mask load errors or the like.

In addition, in the explanation above, the position of the EUV mask 133 is detected before the EUV mask 133 placed on the removable pellicle base 131 is mounted onto the mask chuck 142. The EUV mask 133 and the mask chuck 142 are positioned (i.e., aligned) so that they are positioned in the predetermined range by causing the mask stage to drive the mask chuck 142 according to the value of the detected position. However, another arrangement is acceptable in which the EUV mask 133 and the mask chuck 142 are positioned (i.e., aligned) so that they are positioned in the predetermined range by causing the transporting robot hand 134 to drive the EUV mask 133, the transporting robot hand 134 holding the EUV mask 133 via the pellicle base 131.

Further, when there is a spatial constraint like in the surrounding of the mask stage, it is possible to make the positional arrangement of the image pickup device more flexible by using the method according to the fifth embodiment.

Because the scattered light from the edge portion 150 of the EUV mask 133 is a simple bundle of rays, it is possible to configure the position detecting apparatus 141 with a simple structure. Accordingly, the position detecting apparatus 141 is able to detect positions while hardly being influenced by an image skew, which can often be a problem in a position detecting optical system that employs an alignment mark. Consequently, the position detecting apparatus 141 is less likely to be subject to constraints related to the positional arrangement than other optical-system detecting apparatuses that include many lenses and optical parts and have a relatively complicated structure and a large size.

To realize a high level of precision, it is desirable to have an arrangement in which the configuration of the position detecting apparatus 141 is basically the same as the configuration of the position detecting apparatus provided in another apparatus or in the mask load port of the exposure apparatus, so that the image pickup devices and the illuminating devices are in substantially the same positional arrangement. In particular, by using a positional-arrangement relationship in common with regard to the first illuminating device for radiating light from a lateral face direction, the substrate, and the image pickup device, it is possible to minimize an error in the position detection process when the position of the substrate is detected on the mask stage included in the exposure apparatus by using the difference data "B−A" that has been measured, calculated, and stored in another apparatus or in the mask load port. Consequently, in terms of maintaining the level of precision in the position detection process, it is necessary to keep in mind that the positional arrangement of the image pickup devices and the illuminating devices is not completely flexible.

As explained above, when the exposure apparatus according to the fifth embodiment is used, by using the position detecting apparatus and the method used by the position detecting apparatus that have been explained in the first and the third embodiments, it is possible to detect the position of the EUV mask and the position of the mask chuck before the EUV mask is held by the mask chuck, so as to have the EUV mask held by the mask chuck after checking the positional relationship between them. Thus, it is possible to provide an exposure apparatus that is able to ensure the alignment of the mask. The present invention is not limited to the exemplary embodiments described above. In the first to the third embodiments, one first illuminating device and one second illuminating device are used; however, it is acceptable to use a plurality of illuminating devices of each type. Further, in the first to the fifth embodiments, LEDs are used in each of the first and the second illuminating devices; however, it is acceptable to use a fiber illumination that uses a light guide.

In the second and the third embodiments, the pattern-forming surface of the mask substrate or the surface on which a pattern is going to be formed is covered with a cover; however, another arrangement is acceptable in which the other surface of the mask substrate that is opposite to the pattern-forming surface or the surface on which the pattern is going to be formed is covered with the cover. In this situation, the first illuminating device is installed so that the pattern-forming surface of the mask substrate or the surface on which the pattern is going to be formed and the radiation center of the first illuminating device 3 are positioned on substantially the same plane.

In addition, it is acceptable to apply the configuration explained for the image pickup device according to the fifth embodiment also to the positional arrangement of the illuminating device that radiates light onto the mask substrate, as long as the illumination light is radiated, in effect, from a lateral face direction and a perpendicular direction of the substrate mask, with the use of a member such as a return mirror.

In the first to the fifth embodiments, the first illuminating device is installed so that the lower surface of the mask substrate and the radiation center of the first illuminating device are positioned on substantially the same plane. However, the advantageous effects of the present invention are sufficiently achieved, even if the lower surface and the radiation center are not necessarily positioned on the same plane. For example, even if there is a difference in the heights that is larger than the thickness of the substrate, when the detecting unit according to the present invention is used, it is possible to form an edge image with high quality and to perform the measuring process with a high level of precision, by radiating, onto the substrate edge, illumination light that has an intensity distribution spreading in the up-and-down direction. Also, as long as the illumination light is in a range by which scattered light is generated on an edge, even if the illumination light has a difference in the height direction or is at an angle in a direction of the radiation center, when the detecting unit according to the present invention is used, it is possible to form an edge image with high quality and to perform the measuring process with a high level of precision.

Furthermore, according to the first to the fifth embodiments, a CCD camera is used as the image pickup device. However, it is acceptable to use a CCD line sensor or a Complementary Metal Oxide Semiconductor (CMOS) sensor as the image pickup device. Needless to say, it is possible to apply any device to the embodiments of the present invention as long as the device is able to detect the intensity of scattered light on an edge generated by illumination or the brightness/darkness of the illumination and to measure the positions.

It is also possible to apply the present invention to a situation in which a commonly-used optical part is used between a CCD camera serving as the image pickup device and a mask substrate or a cover on which the detection process is performed. Examples of commonly-used optical parts include a magnifying lens, a telecentric lens, a teleconverter lens, a color filter, a polarizing filter, and a lens protection filter.

The illumination range for the light being radiated from the direction of a lateral face of the mask substrate is not particularly defined. However, it is desirable to radiate the light onto a plane of a finite size that is positioned parallel to the longitudinal direction of the mask substrate.

It is possible to apply many different shapes to the structure of the parts that support the mask substrate. It is desirable to determine the shape so that there is no physical conflict with the illumination range, the detection range, and other surroundings. The mask substrate does not necessarily have to be supported on the four corners, as described above. It is acceptable to support the mask substrate on three points.

According to the first to the fourth embodiments, a Cr mask, which is most popularly used these days, or an EUV mask, which is used for the next-generation lithography, is used as the mask substrate serving as a base board for a circuit pattern. However, it is acceptable to use a half-tone mask or a mask of which the base material is calcium flouoride.

It is possible to apply the position detecting apparatus and the position detecting method according to any one of the first to the fifth embodiments to various types of manufacturing apparatuses, after applying a modification thereto, as necessary. For example, according to the fourth embodiment, the second illuminating device is provided in the second processing chamber. However, it is possible to detect the position of the mask substrate by using only the first illuminating device.

Thus, when the position of the cover is mechanically determined in advance, it is possible to avoid the problem of the physical touching and the frictions between the mask substrate and the cover by only checking the position of the mask substrate. In that situation, the second illuminating device will not be necessary.

In addition, as explained in the first embodiment, it is acceptable to reverse the order in which the position measuring process are performed, namely, the process performed with the first illuminating device and the process performed with the second illuminating device. It is also acceptable for the difference calculating unit to calculate the difference in the position data in a reverse order so as to perform a subtraction. Needless to say, it is possible to apply the present invention to a method for adding the difference in the stored position data, as long as the method is defined without contradiction.

In the position detecting apparatus and the position detecting method according to the first to the fifth embodiments, an image intensity profile of the light is calculated so that the first derivative of the waveform of the image intensity profile of the light is calculated, and a search is conducted from the left to the right in the derivative waveform after a threshold value for the intensity level is set in advance in the derivative waveform. A position at which the derivative waveform intersects the threshold value is detected as the position of the edge portion of the substrate. However, the process for determining the edge position of the substrate is not limited to this example. For example, it is possible to determine the edge position by performing a necessary image processing like applying the derivative calculation twice or applying a Laplace transform. Further, in the description above, the threshold value is set based on the noise level of the waveform; however, the present invention is not limited to this example.

According to the fourth embodiment, the difference data for the edge position in the substrate edge portion of the mask substrate is calculated by using the first illuminating device and the second illuminating device in the first processing chamber; however, another arrangement is acceptable in which a position detecting apparatus like the one provided in the first processing chamber is provided in a device that transfers a mask substrate from a mask case (i.e., a shipping box) to a mask pod so that the process of calculating the difference data is performed. Further, it is acceptable to apply a position detecting apparatus like the one provided in the first processing chamber to a situation in which a mask substrate is mounted on a transporting robot so that the process of calculating the difference data is performed. In this situation, it is easier to apply the present invention because the constraints related to the mechanisms of the apparatuses and devices and the positional arrangements of the devices are alleviated.

As explained above as the exemplary embodiment, it is possible to apply the mask stage on which the mask substrate is mounted and that has been explained in the description of the fifth embodiment to another apparatus in which a mask substrate needs to be set up after the position thereof is checked. For example, it is possible to apply the present invention with various modifications, without departing from the gist of the present invention, to a situation in which the position of a mask substrate needs to be detected while the mask substrate being the target of the measuring process is positioned in a small space. In this situation, a small space denotes a situation where a testing optical system in a testing apparatus, which is a typical example, is positioned very close to a mask substrate or where the distance between a mask substrate and a wafer in a proximity exposure apparatus is extremely small. The apparatus may be a mask drawing apparatus.

It is possible to apply the position detecting apparatus and the position detecting method according to the exemplary embodiments not only as one of the functions of another apparatus, but also to an alignment apparatus that detects the position of a substrate and determines the position of the substrate.

Further, the position detecting apparatus and the position detecting method according to the exemplary embodiments that are used in a transporting apparatus, a substrate moving and placing apparatus, or a position determining apparatus are able to detect not only the positions of mask substrates but also the positions of display devices such as liquid crystal display panels.

Furthermore, it is possible to embody the present invention with various modifications without departing the gist of the present invention.

According to an embodiment of the present invention, it is possible to detect the edge position of the mask substrate based on the images taken while the light beams are being radiated from the mutually-different directions. Thus, it is possible to determine the edge position without being influenced by the shape of the edge portion of the mask substrate, regardless of whether a pattern has already been formed on the mask substrate. Consequently, it is possible to achieve an advantageous effect where the position of the mask substrate is detected with a high level of precision.

In addition, according to another embodiment of the present invention, even if the mask is attached to a cover-like structure such as a removable pellicle, it is possible to determine the edge position based on the edge position of the mask substrate that has been detected before attaching the mask substrate to the cover-like structure and the edge position of the mask substrate that has been detected after the attachment. Thus, it is possible to achieve an advantageous effect where the position of the mask substrate is detected with a high level of precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A position detecting apparatus comprising:
   at least one first illuminating unit that is located so that a rear surface of a substrate and a radiation center of an illuminating mechanism of the first illuminating unit are positioned on a substantially same plane, and radiates light onto the substrate in a direction substantially parallel to a front surface and the rear surface of the substrate from a lateral direction of the substrate;
   a second illuminating unit that is provided above the front surface of the substrate and radiates light onto an area including an edge portion of the substrate in a direction substantially perpendicular to the front surface of the substrate;
   an image pickup unit that is disposed on a rear surface side of the substrate so that an edge of the substrate is positioned within an image pickup range thereof and takes an image of the substrate from the rear surface side of the substrate while the light is being radiated from the first illuminating unit or while the light is being radiated from the second illuminating unit, respectively; and
   an edge-position detecting unit that detects at least one edge position of the substrate, based on a first image taken by the image pickup unit while the light is being radiated from the first illuminating unit and a second image taken by the image pickup unit while the light is being radiated from the second illuminating unit, respectively.

2. The apparatus according to claim 1, further comprising:
   a difference calculating unit that calculates a difference between an edge position detected based on the first image and an edge position detected based on the second image; and
   an edge-position determining unit that determines an edge position obtained by adding the difference to an edge position detected based on an image taken by the image pickup unit while the light is being radiated from the first illuminating unit as the edge position of the substrate.

3. The apparatus according to claim 2, wherein the edge-position determining unit determines the edge position detected based on the image taken by the image pickup unit while the light is being radiated from the first illuminating unit as the edge position of the substrate, when the difference is smaller than a predetermined value.

4. The apparatus according to claim 1, further comprising:
   a judging unit that judges whether one of a covering unit for covering the substrate and a supporting unit for supporting the substrate is mounted on the substrate;
   a difference calculating unit that calculates a difference between an edge position detected based on the first image and an edge position detected based on the second image;
   a difference storing unit that stores the difference; and
   an edge-position determining unit that determines the edge position of the substrate, wherein
   the difference calculating unit calculates the difference and causes the difference storing unit to store the difference, when the judging unit has judged that neither the covering unit nor the supporting unit is mounted on the substrate, and
   the edge-position detecting unit determines an edge position obtained by adding the difference to an edge position detected based on an image taken by the image pickup unit while the light is being radiated from the first illuminating unit as the edge position of the substrate, when the judging unit has judged that one of the covering unit and the supporting unit is mounted on the substrate.

5. The apparatus according to claim 4, wherein the edge-position determining unit determines the edge position detected based on the image taken by the image pickup unit while the light is being radiated from the first illuminating unit as the edge position of the substrate, when the difference is smaller than a predetermined value.

6. The apparatus according to claim 5, wherein the edge-position determining unit determines the edge position detected based on the image taken by the image pickup unit while the light is being radiated from the first illuminating unit as the edge position of the substrate, when the difference is smaller than a predetermined value.

7. The apparatus according to claim 5, wherein the edge-position detecting unit detects at least one edge position of one of the covering unit and the supporting unit.

8. The apparatus according to claim 5, wherein one of the covering unit and the supporting unit covers a part of a surface side of the substrate on which a pattern is to be formed.

9. The apparatus according to claim 5, wherein one of the covering unit and the supporting unit covers a part of an end portion of the substrate, the end portion being positioned on a surface side of the substrate on which a pattern is to be formed.

10. The apparatus according to claim 4, wherein the edge-position detecting unit detects at least one edge position of one of the covering unit and the supporting unit.

11. The apparatus according to claim 4, wherein one of the covering unit and the supporting unit covers a part of a surface side of the substrate on which a pattern is to be formed.

12. The apparatus according to claim 4, wherein one of the covering unit and the supporting unit covers a part of an end portion of the substrate, the end portion being positioned on a surface side of the substrate on which a pattern is to be formed.

13. The apparatus according to claim 1, further comprising:
- a judging unit that judges whether the substrate is mounted on one of a covering unit for covering the substrate and a supporting unit for supporting the substrate;
- a difference calculating unit that calculates a difference between an edge position detected based on the first image and an edge position detected based on the second image;
- a difference storing unit that stores the difference; and
- an edge-position determining unit that determines the edge position of the substrate, wherein
- the difference calculating unit calculates the difference and causes the difference storing unit to store the difference, when the judging unit has judged that the substrate is mounted on neither the covering unit nor the supporting unit, and
- the edge-position detecting unit determines an edge position obtained by adding the difference to an edge position detected based on an image taken by the image pickup unit while the light is being radiated from the first illuminating unit as the edge position of the substrate, when the judging unit has judged that the substrate is mounted on one of the covering unit and the supporting unit.

14. The apparatus according to claim 1, wherein the substrate is one of a photomask blank substrate, a mask substrate currently being treated in a process, and a mask substrate having a completed pattern.

15. A position detecting method comprising:
- first illuminating light onto a substrate in a direction substantially parallel to a front surface and the rear surface of the substrate from a lateral direction of the substrate so that a rear surface of the substrate and a radiation center of an illuminating mechanism are positioned on a substantially same plane;
- second illuminating light onto an area including an edge portion of the substrate in a direction substantially perpendicular to the front surface of the substrate from above the front surface of the substrate;
- taking an image of the substrate from the rear surface side thereof so that an edge of the substrate is positioned within an image pickup range while the light is being radiated in the first illuminating or while the light is being radiated in the second illuminating, respectively; and
- detecting at least one edge position of the substrate, based on a first image taken in the taking while the light is being radiated in the first illuminating and a second image taken in the taking while the light is being radiated in the second illuminating, respectively.

16. The method according to claim 15, further comprising:
- calculating a difference between an edge position detected based on the first image and an edge position detected based on the second image; and
- determining an edge position obtained by adding the difference to an edge position detected based on an image taken by the image pickup unit while the light is being radiated from the first illuminating unit as the edge position of the substrate.

* * * * *